US012800750B2

(12) United States Patent
Kiyoshi et al.

(10) Patent No.: US 12,800,750 B2
(45) Date of Patent: Nov. 17, 2026

(54) INFORMATION PROCESSING DEVICE

(71) Applicants: KGS INC., Tokyo (JP); THE UNIVERSITY OF TOKYO, Tokyo (JP)

(72) Inventors: Ryohei Kiyoshi, Tokyo (JP); Takafumi Noguchi, Tokyo (JP); Tsukasa Mizutani, Tokyo (JP)

(73) Assignees: KGS INC., Tokyo (JP); The University of Tokyo, Tokyo (JP)

( * ) Notice: Subject to any disclaimer, the term of this patent is extended or adjusted under 35 U.S.C. 154(b) by 402 days.

(21) Appl. No.: 18/557,135

(22) PCT Filed: Apr. 26, 2022

(86) PCT No.: PCT/JP2022/018932
§ 371 (c)(1),
(2) Date: Oct. 25, 2023

(87) PCT Pub. No.: WO2022/230897
PCT Pub. Date: Nov. 3, 2022

(65) Prior Publication Data

US 2024/0210552 A1 Jun. 27, 2024

(30) Foreign Application Priority Data

Apr. 26, 2021 (JP) ................................ 2021-074401

(51) Int. Cl.
*G01S 13/88* (2006.01)
*G01N 22/00* (2006.01)
(Continued)

(52) U.S. Cl.
CPC ............ *G01S 13/885* (2013.01); *G01N 22/00* (2013.01); *G01S 7/411* (2013.01); *G01S 13/89* (2013.01);
(Continued)

(58) Field of Classification Search
CPC ........ G01S 13/885; G01S 7/411; G01S 13/89; G01S 7/414; G01N 22/00; G01N 22/02; G01V 3/12
See application file for complete search history.

(56) References Cited

U.S. PATENT DOCUMENTS 5,420,589 A * 5/1995 Wells .................. H01Q 13/085 342/22
7,075,315 B2 * 7/2006 Tanaka ................ G01N 33/383 324/642
(Continued)

FOREIGN PATENT DOCUMENTS

JP S60-200183 A 10/1985
JP 2528148 B2 8/1996
(Continued)

OTHER PUBLICATIONS

WO-2020195347-A1 Machine Translation (Year: 2020).*
(Continued)

*Primary Examiner* — Matthew M Barker
(74) *Attorney, Agent, or Firm* — SoCal IP Law Group LLP; Mark Andrew Goldstein

(57) ABSTRACT

Disclosed herein is an information processing device that includes: an acquisition unit that acquires data of a reflected wave generated by irradiating an electromagnetic wave from the surface of an inspection object toward an interior of the inspection object and data of a reflected wave occurring due to the electromagnetic wave being reflected by the interior of the inspection object; and a detection unit that detects the presence or absence of a void on the basis of the data of the reflected wave acquired by the acquisition unit.

6 Claims, 13 Drawing Sheets

(51) Int. Cl.

| | |
|---|---|
| ***G01N 22/02*** | (2006.01) |
| ***G01S 7/41*** | (2006.01) |
| ***G01S 13/89*** | (2006.01) |
| ***G01V 3/12*** | (2006.01) |

(52) U.S. Cl.

CPC ............... *G01V 3/12* (2013.01); *G01N 22/02* (2013.01); *G01S 7/414* (2013.01)

(56) References Cited

U.S. PATENT DOCUMENTS

| | | | | |
|---|---|---|---|---|
| 9,194,819 | B2 * | 11/2015 | Bulumulla | G01N 33/383 |
| 11,029,402 | B2 * | 6/2021 | Huston | G01S 7/282 |
| 2003/0098697 | A1 * | 5/2003 | Tanaka | G01N 22/02 324/637 |
| 2008/0068256 | A1 * | 3/2008 | Niedzwiecki | G01S 13/34 342/146 |
| 2010/0237871 | A1 * | 9/2010 | Allouche | H01Q 13/085 324/337 |
| 2016/0259045 | A1 * | 9/2016 | Huston | H01Q 13/085 |
| 2017/0269204 | A1 * | 9/2017 | Takamine | G01N 33/383 |
| 2018/0335395 | A1 * | 11/2018 | Seavey | G01S 13/885 |
| 2021/0072377 | A1 * | 3/2021 | Lehner | H04W 4/40 |
| 2023/0243956 | A1 * | 8/2023 | Agarwal | G01S 13/86 342/22 |

FOREIGN PATENT DOCUMENTS

| | | | | |
|---|---|---|---|---|
| JP | H09-088351 | A | 3/1997 | |
| JP | 2001-201463 | A | 7/2001 | |
| JP | 2003-166950 | A | 6/2003 | |
| JP | 2005-043197 | A | 2/2005 | |
| JP | 2020-051851 | A | 4/2020 | |
| JP | 6751957 | B1 | 9/2020 | |
| JP | 2020-186994 | A | 11/2020 | |
| WO | WO-8803276 | A1 * | 5/1988 | G01V 3/15 |
| WO | WO-2020195347 | A1 * | 10/2020 | G01V 3/12 |
| WO | 2022/230897 | A1 | 11/2022 | |

OTHER PUBLICATIONS

WO-8803276-A1 Machine Translation (Year: 1988).*

Japan Patent Office/ISA, International Search Report and Written Opinion for PCT Application No. PCT/JP2022/018932, mail date Jul. 19, 2022.

Japan Patent Office, Notification of Reasons for Refusal for Japanese Patent Application No. 2023-51757, mail date Jun. 25, 2024.

* cited by examiner

| BAND | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| UPPER LIMIT VALUE | 0.7 | 0.9 | 1.1 | 1.3 | 1.5 | 1.7 | 1.9 | 2.1 | 2.3 | 2.5 | 2.7 | 2.9 | 3.1 | 3.3 | 3.5 | 3.7 |
| LOWER LIMIT VALUE | 0.5 | | | | | | | | | | | | | | | |
| WEIGHT | 16 | 15 | 14 | 13 | 12 | 11 | 10 | 9 | 8 | 7 | 6 | 5 | 4 | 3 | 2 | 1 |

(A)

(B)

(C)

INFORMATION PROCESSING DEVICE

RELATED APPLICATION INFORMATION

This patent claims priority from International PCT Patent Application No. PCT/JP2022/018932, filed Apr. 26, 2022 entitled, "INFORMATION PROCESSING DEVICE", which claims priority to Japanese Patent Application No. 2021-074401, filed Apr. 26, 2021, all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

TECHNICAL FIELD

The present invention relates to an information processing device.

BACKGROUND

Infrastructure such as bridges, tunnels, paving, houses, troughs, rivers, and waters are important lifelines, and at the same time, are an important basis for the industry supporting capitalism. Concrete is often used as a material for such infrastructure. However, some of the concrete may fall due to deterioration of internal structures or deterioration over time due to failure of appropriate construction management. For this reason, precaution and maintenance are performed in which structures of infrastructure are appropriately inspected and managed and addressed in advance before a problem occurs.

The inspection mainly includes visual inspection, non-destructive inspection using a measuring machine, and destructive inspection in which samples are collected accompanying destruction of a part of a structure. The destructive inspection may obtain information with higher accuracy than the non-destructive inspection. However, it is not desirable to often use the destructive inspection as it damages the structure. Therefore, it is possible to perform a more reasonable inspection by first screening the degradation state by the non-destructive inspection and performing the destructive inspection only at a portion requiring accuracy. Therefore, it is considered that increasing the accuracy of the non-destructive inspection improves the accuracy of the screening, reduces the destructive inspection, and appropriately detects the location to be repaired, thereby contributing to maintenance and management of the infrastructure. As a technique of non-destructive inspection, for example, a technique of estimating the site of a buried pipe embedded in the ground is disclosed (Patent Document 1, Japanese Unexamined Patent Application, Publication No. 2020-186994).

SUMMARY OF THE INVENTION

Problems to be Solved by the Invention

Examples of the sites to be repaired in the concrete include voids (junkers, cavities, etc.) caused by insufficient filling of the concrete, aging deterioration, etc. Here, the junker refers to a portion in which a large amount of coarse aggregates are collected in a part of concrete due to poor filling of mortar or the like, thereby increasing the number of gaps. When the voids are left unrepaired, deterioration of the concrete and corrosion of the reinforcing steel occur as internal defects over time, and the influence may lead to a large accident due to peeling or dropping of the concrete pieces.

However, since the method of detecting the voids in the non-destructive inspection is a method in which a technician discriminates the result obtained from the inspection device, a difference between individuals may occur in the detection result of the void or misdiagnosis may occur.

The present invention has been made in view of the above circumstances, and an object of the present invention is to detect a void in an inspection object with high accuracy.

Means for Solving the Problems

In order to achieve the above object, an aspect of the present invention is directed to an information processing device including: an acquisition unit that acquires data of a reflected wave generated by irradiating an electromagnetic wave from a surface toward an interior of an inspection object and causing the electromagnetic wave to be reflected inside the inspection object; and a detection unit that detects presence or absence of based on the data of the reflected wave acquired by the acquisition unit.

Effects of the Invention

According to the present invention, it is possible to detect a void in an inspection object with high accuracy.

DETAILED DESCRIPTION—PREFERRED MODE FOR CARRYING OUT THE INVENTION

First Embodiment

Summary

Figure 1:
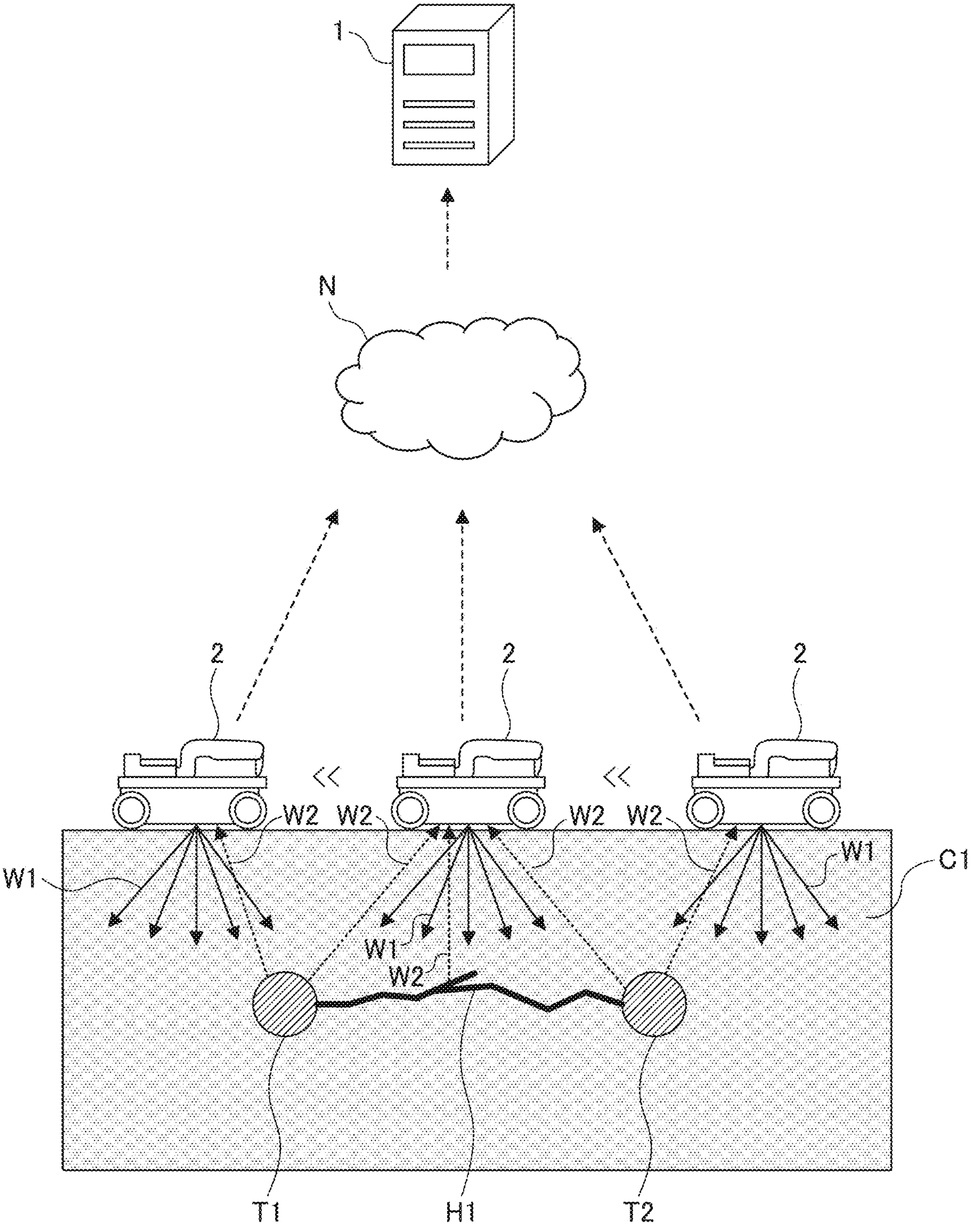
FIG. 1 is a diagram of an example of detecting a void in an inspection object.

Hereinafter, a first embodiment will be described with reference to the drawings. FIG. 1 is a diagram of an example of void detection to which an information processing device according to a present embodiment is applied;

In the present embodiment, an example in which the inspection object is a composite structure including reinforcing steel and concrete will be described.

In the example of FIG. 1, reinforcing steels T1 and T2 are embedded in a concrete C1, and a void H1 exists therebetween. Inspection devices 2 are each provided with wheels, and while moving on the upper surface of the concrete C1, an electromagnetic wave W1 is irradiated toward the inside of the concrete C1 to acquire (measure) a reflected wave W2 from the inside of the concrete C1. The data of the reflected wave W2 detected by the inspection device 2 is transmitted to a server 1 via a network N. The server 1 determines whether or not a void exists in the concrete C1 based on the acquired data of the reflected wave W2.

Examples of the void include a cavity in an inspection object (concrete), a junker, an internal crack, a horizontal crack, or the like, and such a void is referred to as a defect or an abnormal portion in the inspection object. By detecting such a cavity, it is possible to find unintended defects such as an internal cavity due to a filling failure or floating due to rusting of a pipe. Further, by detecting such a junker, for example, it is possible to find a defective portion due to a filling failure, an initial defect generated during construction, and the like. Here, the junker refers to a portion in which a large amount of coarse aggregates are collected in a portion of concrete due to poor filling of mortar or the like, thereby increasing the number of gaps. In the present embodiment, a void having a gap of 2 mm or more is used as a target. However, the size and shape of the void to be detected are not particularly limited.

In the present embodiment, an example in which an electromagnetic wave radar method is used as an inspection method of the inspection device 2 will be described. The electromagnetic wave radar method is an inspection method mainly used for reinforcing steel exploration, and by irradiating an electromagnetic wave from a transmission antenna toward the inside of a concrete and detecting a reflected wave thereof through a receiver antenna, a time period from the irradiation until the detection can be calculated, and the distance to the reflected object can be detected. In addition, positional information in relation to a planar location can be obtained by moving the inspection device 2 incorporating a distance meter. The wavelength, amplitude, and frequency of an electromagnetic wave vary depending on the kind of the electromagnetic wave, and the name and use of the electromagnetic wave vary depending on the frequency. The selection of the wavelength for use in the radar is determined by the distance to the object to be measured, resolution, and dimensions of the antenna. In general, electromagnetic waves have a property whereby, as the frequency is higher, the temporal resolution becomes higher; however, as the frequency is higher, the attenuation becomes greater and the electromagnetic waves do not reach deeper. Although the type of the electromagnetic wave is not particularly limited, an example in which microwaves in a band of 300 MHz to 3 GHz are used as the electromagnetic wave will be described in the present embodiment. Further, in the electromagnetic wave radar method, there is an inspection method using a phase, a level, and a shape of a reflected wave; however, since there are variations in inspection accuracy, an example in which a void is detected based on a frequency of the reflected wave will be described in the present embodiment.

System Configuration

Figure 2:
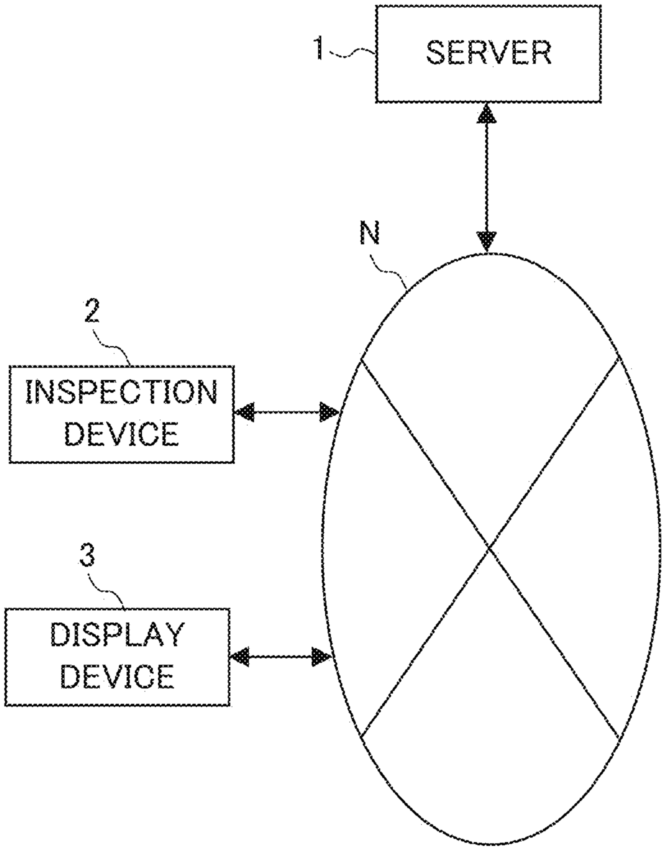
FIG. 2 is a diagram of an outline of a configuration of a void detection system.

FIG. 2 is a diagram of an outline of a system configuration of a void detection system according to the present embodiment. The void detection system according to the present embodiment is configured by connecting a server 1 for performing void detection processing, an inspection device 2 operated by a person in charge of inspection, and a display device 3 for displaying a detection result to each other via a predetermined network N such as the Internet.

The server 1 executes various processing in cooperation with the operations of the inspection device 2 and the display device 3. By moving the surface of the concrete C1 (inspection object) by an operation of the person in charge of inspection, the inspection device 2 irradiates electromagnetic waves into the concrete C1 and detects reflected waves of the electromagnetic waves. The display device 3 displays an inspection result of the inspection device 2 and a void detection result of the server 1, and displays an operation screen.

In the void detection system configured in this manner, the server 1 performs the void detection processing based on the data of the reflected wave acquired from the inspection device 2, and the presence or absence of the void in the concrete C1 and the position of the void (horizontal position or vertical position) are displayed on the display device 3. This makes it possible to prompt a person in charge of inspection to take appropriate measures before a serious problem occurs in the concrete.

Hardware Configuration

Figure 3:
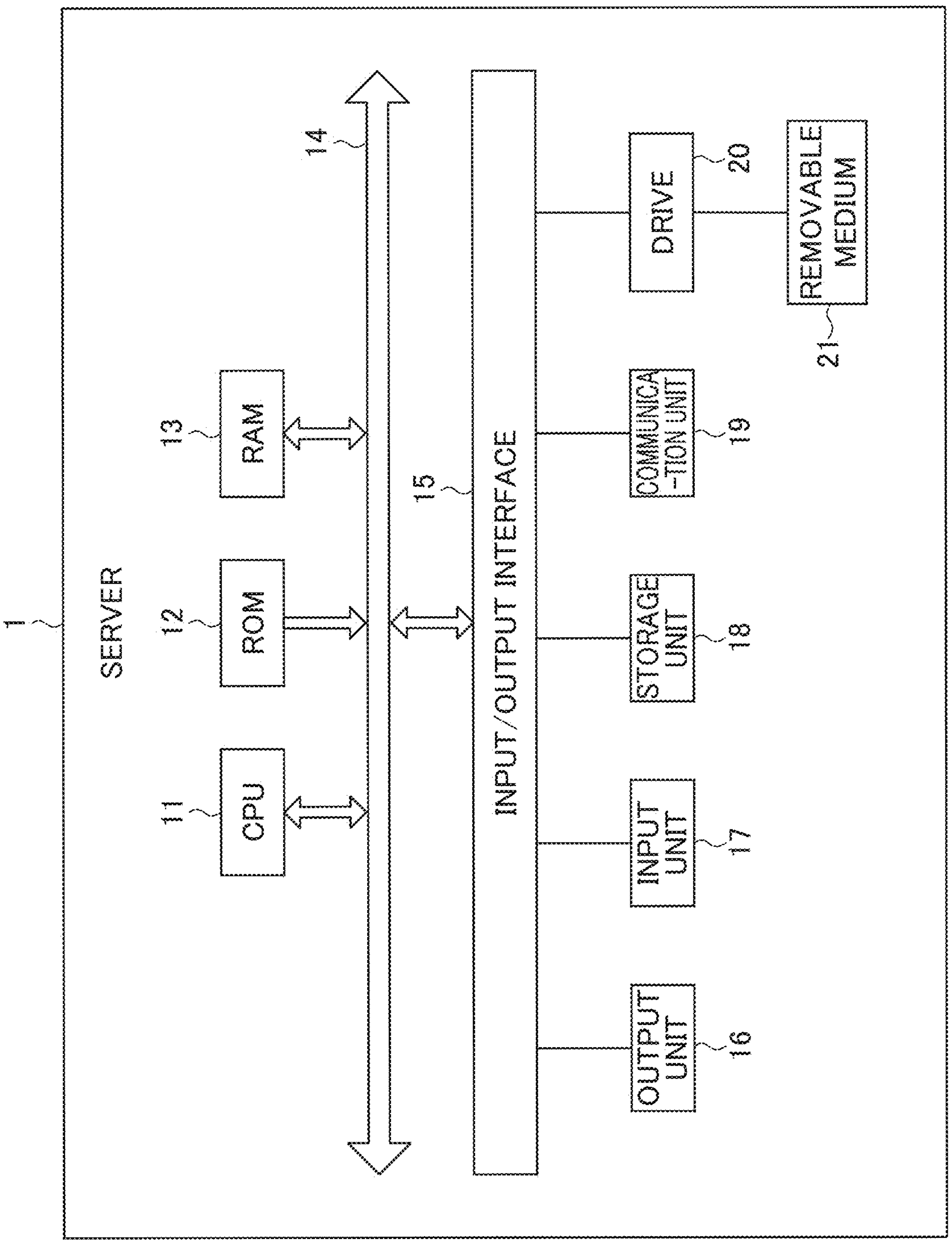
FIG. 3 is a block diagram of a hardware configuration of a server.

FIG. 3 is a block diagram of a hardware configuration of the server 1 according to the present embodiment. The server 1 includes a CPU (Central Processing Unit) 11, ROM (Read Only Memory) 12, RAM (Random Access Memory) 13, a bus 14, an input/output interface 15, an output unit 16, an input unit 17, a storage unit 18, a communication unit 19, and a drive 20.

The CPU 11 executes various processing according to a program recorded in the ROM 12 or a program loaded from the storage unit 18 to the RAM 13. The RAM 13 also stores data necessary for the CPU 11 to execute various kinds of processing. The CPU 11, the ROM 12, and the RAM 13 are connected to each other via a bus 14. The input/output interface 15 is also connected to the bus 14.

The output unit 16, the input unit 17, the storage unit 18, the communication unit 19, and the drive 20 are connected to the input/output interface 15. The output unit 16 includes a display, a speaker, and the like, and outputs various kinds of information as images and sounds. The input unit 17 includes a keyboard, a mouse, and the like, and inputs various kinds of information. The storage unit 18 is configured by a hard disk, DRAM (Dynamic Random Access Memory), or the like, and stores various data. The communication unit 19 communicates with other devices via the network N including the Internet.

A removable medium 21 including a magnetic disk, an optical disk, a magneto-optical disk, a semiconductor memory, or the like is appropriately mounted to the drive 20.

The program read from the removable medium 21 by the drive 20 is installed in the storage unit 18 as necessary. The removable medium 21 can store various data stored in the storage unit 18 in the same manner as the storage unit 18.

Although not shown, the inspection device 2 has a hardware configuration shown in FIG. 3, and further includes a transmission antenna for generating electromagnetic waves, a receiver antenna for detecting reflected electromagnetic waves, and a rotary encoder for measuring a traveling distance. Although not shown, the display device 3 has the hardware configuration shown in FIG. 3, and further includes a display monitor.

Functional Configuration

Figure 4:
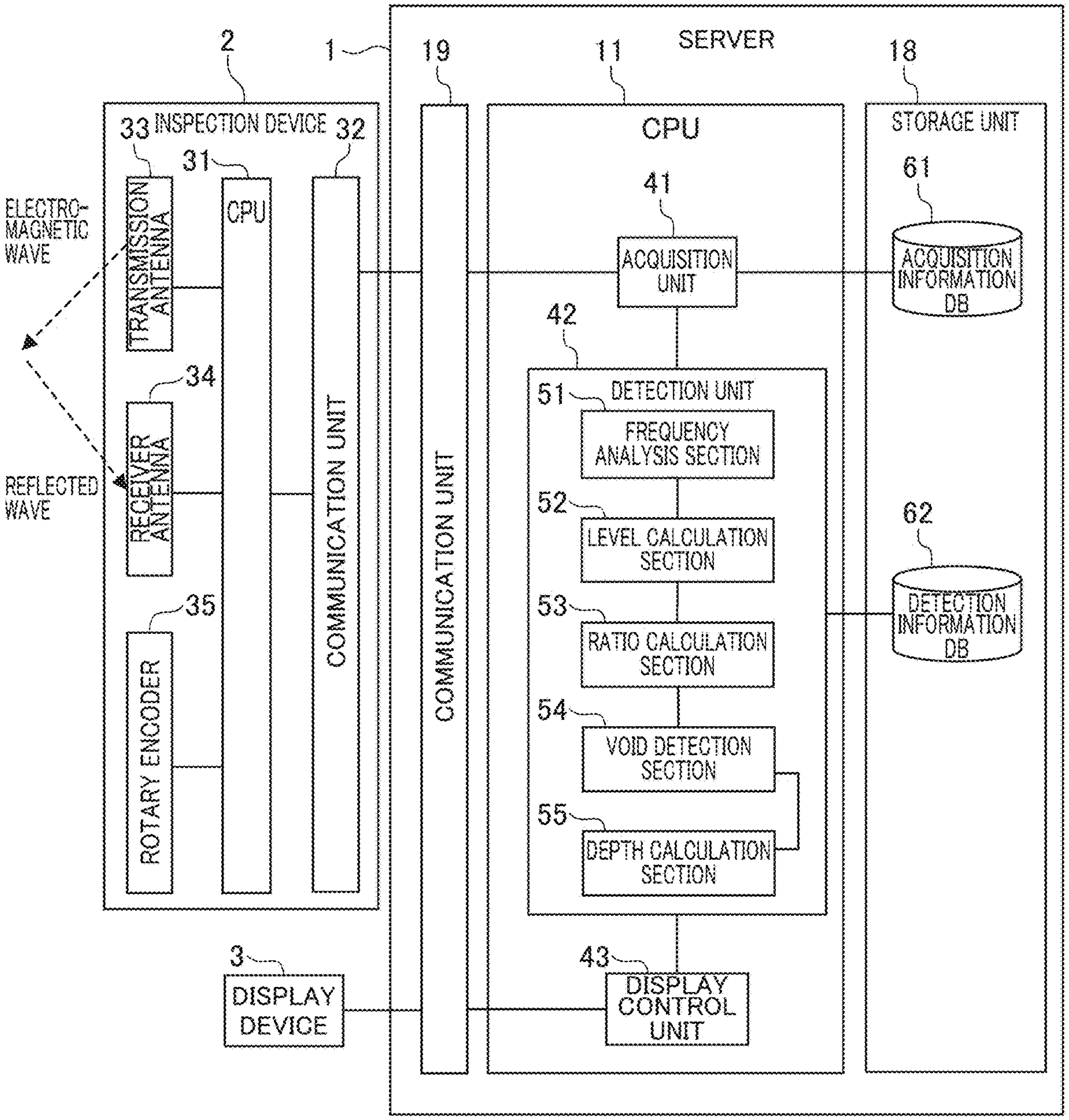
FIG. 4 is a functional block diagram of an example of a functional configuration of a server.

FIG. 4 is a functional block diagram showing an example of functional configurations in the server 1 and the inspection device 2 according to the present embodiment.

Functional Configuration of Inspection Device 2

The CPU 31 of the inspection device 2 controls the transmission antenna 33 to irradiate the concrete C1 (inspection object) with an electromagnetic wave. In the present embodiment, as described above, microwaves in the band of 300 MHz to 3 GHz are used as electromagnetic waves, but the present invention is not particularly limited thereto, and any frequency may be used. Then, the CPU 31 of the inspection device 2 associates the reflected wave (the reflected wave reflected in the concrete C1) acquired via the receiver antenna 34 with the distance information measured by the output signal of the rotary encoder 35 on the time axis. The CPU 31 of the inspection device 2 transmits the data of the reflected wave associated therewith to the server 1 via the communication unit 32.

Functional Configuration of Server 1

When the CPU 11 of the server 1 operates, an acquisition unit 41, a detection unit 42, and a display control unit 43 function.

The acquisition unit 41 acquires data of a reflected wave from the inspection device 2 via the communication unit 19. Specifically, the inspection device 2 irradiates an electromagnetic wave and acquires data (data converted into an electric signal; received signal) of a reflected wave obtained by reflection in the concrete C1.

The detection unit 42 detects a void in the concrete C1 (inspection object) based on the data of the reflected wave acquired by the acquisition unit 41. It can also be considered that the detection unit 42 regards the result obtained by the measurement of the inspection device 2 as an "image" and detects an abnormal portion (junker, cavity) therefrom. A frequency analysis section 51, a level calculation section 52, a ratio calculation section 53, a void detection section 54, and a depth calculation section 55, which are functional sections included in the detection unit 42, will be described below.

The frequency analysis section 51 performs frequency analysis on the data of the reflected wave acquired by the acquisition unit 41. For example, the frequency analysis section 51 performs Fourier transform on the data of a reflected wave to convert the received signal into a level of each frequency.

The level calculation section 52 calculates a value ML (a first signal level in the first frequency band) and a value KL (a second signal level in the second frequency band) which are integral values of the level (power) of the frequency in a predetermined frequency band in the frequency distribution outputted by the frequency analysis section 51. The value ML is a value obtained by integrating a signal level of a predetermined frequency interval in a reference frequency band (basic frequency, standard frequency). The value KL is a value obtained by integrating a signal level of a predetermined frequency interval in a high frequency band (high frequency). As described above, instead of integrating the signal level of the predetermined frequency interval in the reference frequency band, the signal level of the predetermined frequency in the reference frequency band may be used as the value ML. Further, instead of integrating the signal level of the predetermined frequency interval in the high frequency band, the signal level of the predetermined frequency in the high frequency band may be used as the value KL.

The predetermined frequency interval in the reference frequency band indicates 900 MHz to 1200 MHz in the present embodiment. Although the reference frequency band is not limited to the above, it is desirable that the reference frequency band is the highest level frequency band among the signals transmitted from the inspection device 2. Therefore, an electromagnetic wave is actually irradiated from the inspection device 2 to the air, the irradiated electromagnetic wave is totally reflected by an iron plate, a signal of the reflected wave is taken, and a frequency band which is the largest level is specified to determine a reference frequency band (for example, 1 GHz). The reference frequency band, which is a frequency band serving as a reference, can also be regarded as a frequency band that exists constantly regardless of the presence of a junker. The reference frequency band may be determined based on product information such as a catalog of the inspection device 2.

In the present embodiment, the predetermined frequency interval in the high frequency band is 1800 MHZ to 2400 MHz. Although the high frequency band is not limited to the above, it is desirable that the high frequency band is a frequency around a frequency band (for example, 2 GHz) in which a strong reaction appears when a junker exists inside the concrete. The principle of relatively increasing the high-frequency component when a void exists in the concrete will be described later.

Here, the term "high frequency" generally refers to a spectrum of a waveform such as a radio wave or a sound wave having a relatively high frequency. In the present embodiment, the definition of the high frequency indicates simply a high frequency, and the criterion for setting the high frequency is a frequency higher than the center frequency included in the electromagnetic wave to be irradiated.

The ratio calculation section 53 calculates a ratio KR which is a ratio between the value ML and the value KL (Equation 1). Ratio KR=value KL/value ML (1)

Figure 5:
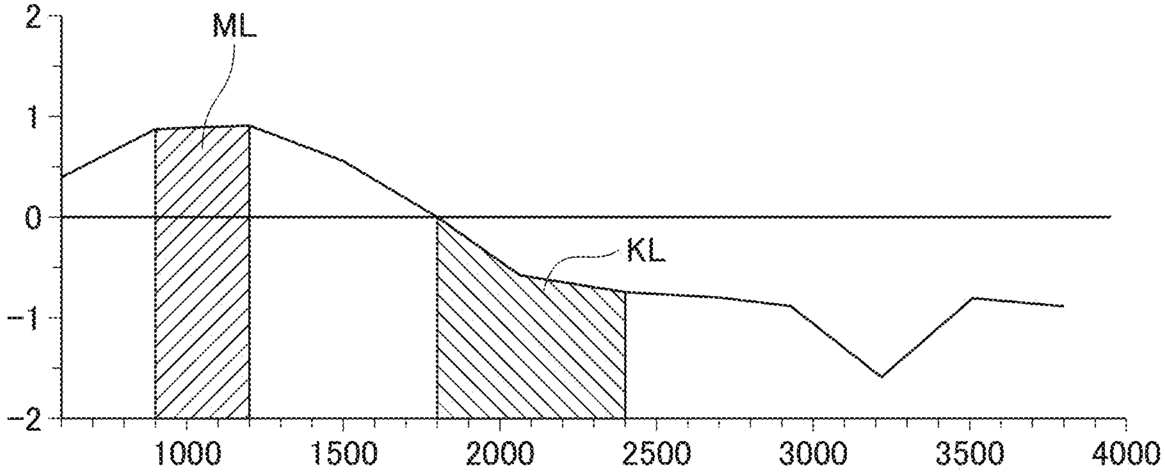
FIG. 5 is a diagram of an example of a frequency distribution of a received signal.

FIG. 5 is a diagram of an example of a frequency distribution of a received signal. In FIG. 5, the horizontal axis represents the frequency (Hz), and the vertical axis represents the signal level. As described above, the value ML is a value obtained by integrating the signal level of a predetermined frequency interval in the reference frequency band (900 MHz to 1200 MHz). The value KL is a value obtained by integrating the signal level of a predetermined frequency interval in the high frequency band (1800 MHZ to 2400 MHZ).

The reason why the ratio KR is used for the void detection will now be described. If it can be grasped in advance that the detection target in the concrete C1 is only voids, the presence or absence of the voids can be determined only by the value KL described above. However, when voids and reinforcing steel (embedded object) are mixed in the concrete C1, it is impractical to determine the presence or absence of voids only by the high-frequency component (value KL). This is because the level of the high-frequency component (high-frequency component originally included in the irradiated electromagnetic wave) included in the reflected wave from the reinforcing steel exceeds the level of the high-frequency component relatively increased by the voids. Here, since the high-frequency component originally included in the electromagnetic wave to be irradiated is a constant ratio, even if the reflected wave from the reinforcing steel returns as a large signal by total reflection, it is unlikely that the reflected wave returns with a ratio equal to or greater than the ratio of the high-frequency component included in the irradiated electromagnetic wave. That is, when the high-frequency component included in the reflected wave is equal to or greater than a certain ratio, it can be recognized that the high-frequency component relatively increased by voids is included. Therefore, whether it is the reflection from voids or the reflection from reinforcing steels is distinguished by evaluating the ratio KR, not the magnitude (value KL) of the high-frequency component itself. In addition, the reason why the denominator of the ratio KR is not the whole of the reflected wave but rather the integral value of the level in the reference frequency band in the reflected wave is that the denominator and the numerator are in the level in the same frequency region, and since the denominator and the numerator are affected in the same manner even when the measurement environment is different, the relative variation is small. It is to be noted that the ratio KR does not have a large difference and is almost uniform with respect to the depth direction. This is one reason that the ratio KR is used for the void detection.

Based on the ratio KR and a predetermined threshold Th, the void detection section 54 determines whether or not the reflected wave is due to a void, thereby detecting the void. For example, the void detection section 54 determines that a void exists when the ratio KR is equal to or greater than a predetermined threshold Th. In the present embodiment, an example in which the predetermined threshold Th is 0.7 will be described. From an example of the experimental result, since the ratio KR based on the reflected wave generated by metal or the like is less than 0.7 and the ratio KR based on the reflected wave generated by a void is 0.7 or more, it is preferable to set the threshold Th to 0.7 (near 0.7). The value of the predetermined threshold Th is not particularly limited, and may be less than 0.7 or may be 0.7 or more.

The depth calculation section 55 calculates the depth of a void (the distance from the surface (ground surface, sloped surface, wall surface) on which the inspection device 2 moves to the void). For example, the depth calculation section 55 calculates the depth using the short-time Fourier transform. The short-time Fourier transform is a method of multiplying data to be analyzed by a window function while shifting the window function to perform Fourier transform on the data, and increasing the temporal resolution by dividing the observation section to be short. Accordingly, by performing the short-time Fourier transform for each predetermined width in the depth direction, the ratio KR can be calculated for each predetermined width (interval). A portion (depth) where the ratio KR is high can be determined as a depth where a void exists.

The display control unit 43 controls to display an operation screen and experimental results on the display device 3. For example, the display control unit 43 displays a graph (hereinafter, the graph is referred to as an A-mode image or an A scope) in which the vertical axis represents time and the horizontal axis represents the amplitude of the reflected wave on the display device 3. A person in charge of inspection can read the reflection time of the received signal, the reflection intensity of the received signal, phase information, and the like by looking at the A-mode image. Further, for example, the display control unit 43 arranges the A-mode images in the scanning direction of the inspection device 2, and displays an image (hereinafter, the image is referred to as a B-mode image or a B scope) in which the vertical axis represents time, the horizontal axis represents the moving distance of the inspection device 2, and the luminance is represented by the amplitude of the A-mode image on the display device 3. The person in charge of inspection can easily confirm how the reflected wave changes with respect to the moving direction of the inspection device 2. Further, for example, the display control unit 43 displays an image (hereinafter, the image is referred to as a KR image) indicating a portion where the ratio KR is high in the B-mode image on the display device 3, with the vertical axis representing time and the horizontal axis representing the moving distance of the inspection device 2. In addition, the display control unit 43 can be regarded as displaying an image indicating the position of the void inside the concrete C1 on the display device 3 as a KR image. The display control unit 43 may control the display device 3 to display information indicating the presence or absence of a void in the concrete C1. A display example in the present embodiment will be described later.

An acquisition information DB 61 and a detection information DB 62 are provided in one area of the storage unit 18. The acquisition information DB 61 records the acquisition information acquired by the acquisition unit 41. The acquisition information includes, for example, data of reflected waves acquired by the inspection device 2. Detection information detected by the detection unit 42 is recorded in the detection information DB 62. The detection information includes, for example, presence or absence, position, depth, and the like of a void or an embedded object.

Processing Contents

Figure 6:
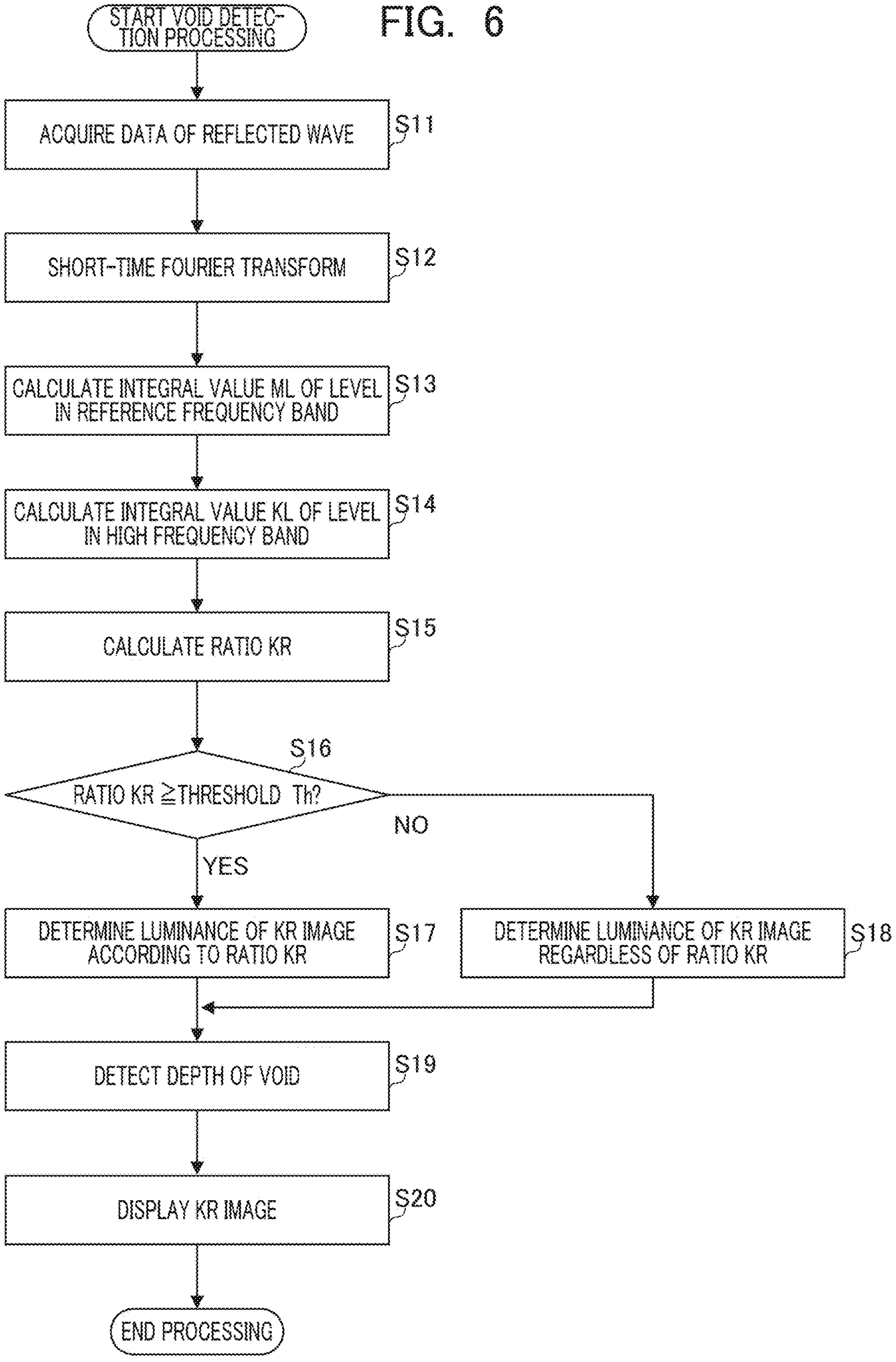
FIG. 6 is a flowchart of the operation of void detection processing.

FIG. 6 is a flowchart of an example of void detection processing according to the present embodiment.

In step S11, the acquisition unit 41 acquires data of a reflected wave from the inspection device 2. The acquisition unit 41 records the acquired data of the reflected wave in the acquisition information DB 61.

In step S12, the frequency analysis section 51 of the detection unit 42 performs short-time Fourier transform on the data of the reflected wave acquired by the acquisition unit 41. Specifically, the data of the reflected wave is divided into a certain period of time (interval), a window function is multiplied for each interval, Fourier transform is performed for each interval, and the data is converted into a level for each frequency. The subsequent processing in steps S13 to S18 is performed for each level of the frequency subjected to Fourier transform for each interval.

In step S13, the level calculation section 52 of the detection unit 42 calculates a value ML that is an integral value of the frequency in the reference frequency band. In the present embodiment, the reference frequency band is a predetermined frequency band (for example, 900 MHz to 1200 MHz) having a frequency of about 1 GHz.

In step S14, the level calculation section 52 of the detection unit 42 calculates a value KL that is an integral value of the frequency in the high frequency band. In the present embodiment, the high frequency band is a predetermined frequency band (for example, 1800 MHZ to 2400 MHz) having a frequency of about 2 GHz.

In step S15, the ratio calculation section 53 of the detection unit 42 calculates a ratio KR between the value ML and the value KL (ratio KR=value KL/value KM).

In step S16, the void detection section 54 of the detection unit 42 determines whether or not the ratio KR is equal to or greater than the predetermined threshold Th.

In step S17, when the ratio KR is equal to or greater than the predetermined threshold Th (S16: YES), the void detection section 54 of the detection unit 42 determines the luminance in the above-described interval (the luminance of the KR image) according to the ratio KR. For example, the void detection section 54 of the detection unit 42 determines the luminance of the KR image so that the luminance becomes higher as the ratio KR becomes higher. Specifically, the luminance of the KR image is determined as follows. In the case of the threshold Th is 0.7 and the luminance value in the KR image is 0 to 255, the luminance value is 0 when the ratio KR is 0.7, the luminance value is increased as the ratio KR increases from 0.7 to 1.0, and the luminance value is 255 when the ratio KR is 1.0. Then, the void detection section 54 of the detection unit 42 records the detection result such as the luminance of the KR image in the detection information DB 62. The void detection section 54 of the detection unit 42 may determine that the detection target is a void when the ratio KR is equal to or greater than the predetermined threshold Th.

In step S18, when the ratio KR is less than the predetermined threshold Th (S16: NO), the void detection section 54 of the detection unit 42 determines the luminance in the above-described interval (the luminance of the KR image) regardless of the ratio KR. For example, the void detection section 54 of the detection unit 42 sets the luminance value in the KR image to 0. Then, the void detection section 54 of the detection unit 42 records the detection result such as the luminance of the KR image in the detection information DB 62. When the ratio KR is less than the predetermined threshold Th, the void detection section 54 of the detection unit 42 may determine that the detection target is not a void.

In step S19, the depth calculation section 55 of the detection unit 42 calculates the depth of the void. Specifically, based on the ratio KR calculated for each predetermined interval, the depth calculation section 55 of the detection unit 42 determines a portion (depth) having a high ratio KR as a depth at which a void exists. The detection unit 42 records a detection result such as the depth of the void in the detection information DB 62.

In step S20, the display control unit 43 displays an image (B-mode image) corresponding to the data of a reflected wave and the KR image generated by the above-described processing on the display device 3. The display contents of the display device 3 will be described later with reference to FIGS. 8A to 8I.

Principle of High-Frequency Component Relatively Increasing Due to Void

Figure 7:
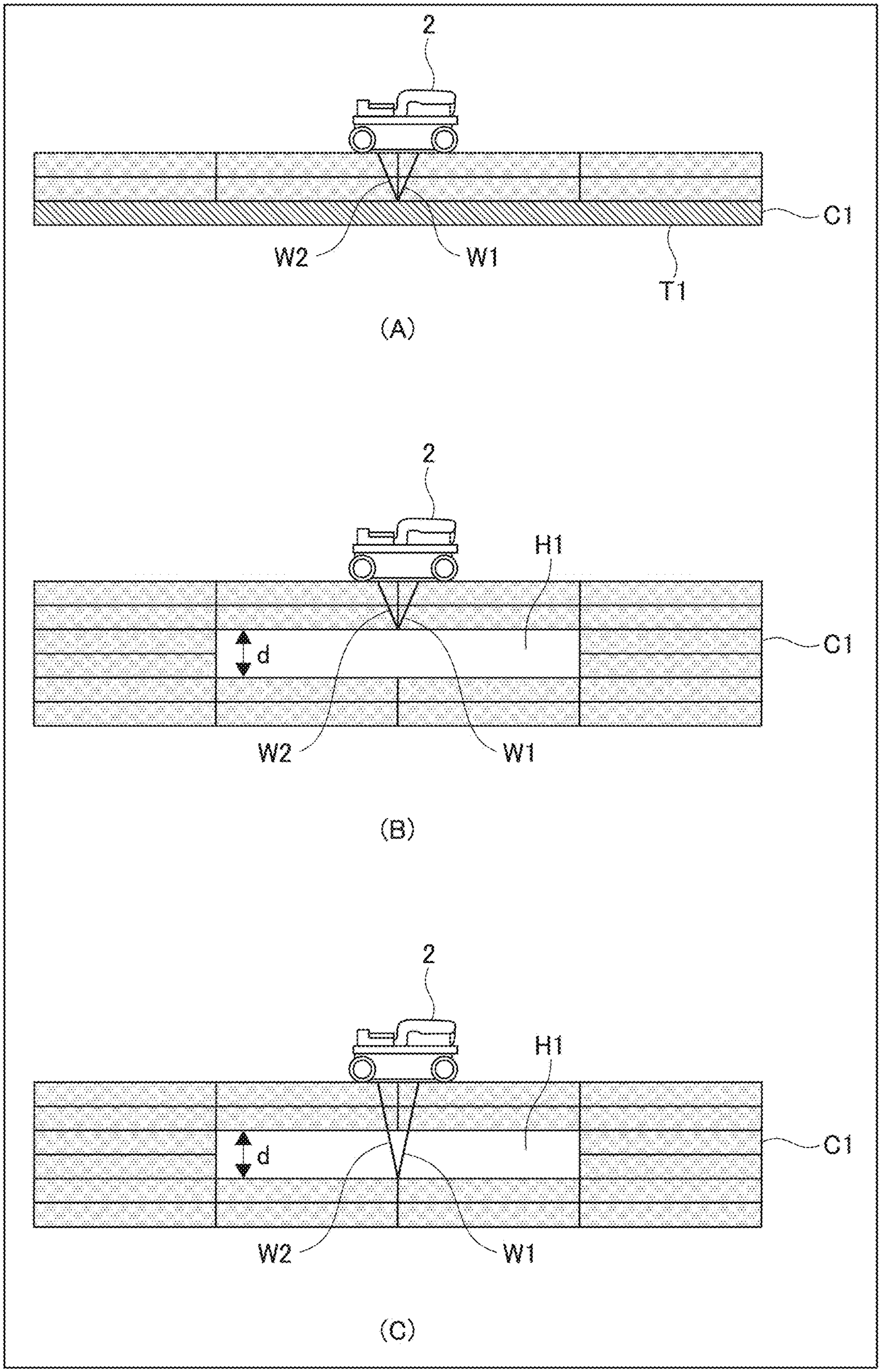
FIG. 7 is a diagram of reflection of electromagnetic waves in an inspection object.

With reference to FIGS. 7A to 7C, the principle of the high-frequency component of the reflected wave relatively increasing when a void exists in the concrete C1 (inspection object) will be described. FIGS. 7A to 7C illustrate reflection and transmission of electromagnetic waves between materials with different relative permittivity ε.

Phase Inversion

FIG. 7A shows a state in which the electromagnetic wave W1 is totally reflected by the reinforcing steel T1 (electric conductor) in the concrete C1. Since the reinforcing steel (metal) is not a dielectric material, the relative permittivity is ∞ (infinity). On the other hand, since the relative permittivity ε of the concrete is set to 4 to 12, the phase is inverted at the time of reflection. Since there is no electromagnetic wave transmitting through the metal, the electromagnetic wave is totally reflected, and the level of the reflected wave W2 becomes high.

FIG. 7B shows a state in which the electromagnetic wave W1 is reflected on and transmitted through the upper surface (the first surface) of a void H1 in the concrete C1. In this case, since only a portion of the incident electromagnetic wave W1 is reflected, the level of the reflected wave W2 is lower than that of the reflection at the reinforcing steel T1 shown in FIG. 7A. Further, since the incident light is incident from the concrete C1 (relative permittivity ε=4 to 12) having a high relative permittivity to the void H1 (air; relative permittivity ε=1) having a low relative permittivity, the phase of the electromagnetic wave is not inverted and is reflected in the same phase.

FIG. 7C shows a state in which the electromagnetic wave W1 is reflected on and transmitted through the bottom surface of the void H1 in the concrete C1 (the second surface opposed to the first surface). In this case, since only a portion of the incident electromagnetic wave W1 is reflected, the level of the reflected wave W2 is lower than that of the reflection at the reinforcing steel T1 shown in FIG. 7A. Here, in principle, the same phenomenon as the reflection at the dielectric surface (the upper surface of the void H1) occurs. However, since the incident direction is different and the incident light is incident from the void H1 (relative permittivity ε=1) having a low relative permittivity to the concrete C1 (relative permittivity ε=4 to 12) having a high relative permittivity, the phase of the electromagnetic wave is inverted. This is different from the reflection at the upper surface of the void H1 shown in FIG. 7B.

Phase Delay

Here, not only the phase of the electromagnetic wave reflected at the bottom surface of the void is inverted, but also a phenomenon whereby the phase is "delayed" by the width of the void (width in the vertical direction) occurs. The phase delay is a subtle change on the time axis, and it is difficult to determine based on the image indicating the amplitude of the phase delay. However, by converting the signal of the reflected wave into the frequency axis, the void detection is performed by focusing on the change of the frequency accompanying the phase delay.

Frequency Shift Due to Void

Here, the relationship among the frequency of the electromagnetic wave to be irradiated, the width of the void, the relative permittivity of the medium, and the level of the reflected wave from the void will be described. First, since the electromagnetic wave is a wave, when the signal f of the electromagnetic wave to be irradiated is represented by a function of time t, the following Equation 2 is obtained.

$$f = \sin(\omega t) \tag{2}$$

Here, the frequency of the electromagnetic wave to be irradiated is denoted by fa (GHz), the width of the void is denoted by d (mm), the relative permittivity of the medium is denoted by ε, and the level of the signal reflected from the void per cyclic period is denoted by L. At this time, when the angular frequency ω=2πfa, the reflection coefficient α at the upper surface of the void (the following equation 3), the reflection coefficient β at the bottom surface of the void (the following equation 4), the cyclic period T, and the round trip time a (ns) (the following equation 5) at which the electromagnetic wave passes through the void are used, the signal $f_u$ (the first reflected wave) reflected from the upper surface of the void and the signal $f_d$ (the second reflected wave) reflected from the bottom surface of the void can be expressed by the following Equations 6 and 7.

Equation 2

$$\alpha = \frac{\sqrt{\varepsilon} - 1}{\sqrt{\varepsilon} + 1} \quad (3)$$

$$\beta = \frac{4\sqrt{\varepsilon}(1 - \sqrt{\varepsilon})}{(1 + \sqrt{\varepsilon})^3} \quad (4)$$

$$a = \frac{2d}{300} \quad (5)$$

$$f_u = \alpha \sin(\omega t) \quad (6)$$

$$f_d = \beta \sin(\omega(t - a)) \quad (7)$$

Since the reflected wave from the void is a combination of the signal $f_u$ reflected from the surface of the void and the signal $f_d$ reflected from the bottom surface of the void, the signal h (composite wave) reflected from the void can be expressed as a function h(t) of the time t by the sum thereof. Since the level of the signal reflected from the void is obtained by integrating the signal h(t), the following Equation 8 is obtained by integrating the interval from 0 to T in order to obtain the effective value L of the signal level per unit time.

$$L = \sqrt{\frac{1}{T}\int_0^T \{h_{(t)}\}^2 dt} \quad (8)$$

According to Equation 8, since the effective value L of the signal level of the outputted signal varies depending on the angular frequency (ω) of the inputted signal, the reflected wave reflected from the void has a frequency characteristic, and a model equation (Equation 9) representing the frequency characteristic is derived. Equations 8 and 9 show that, although the relative permittivity ε relates to the level of the reflected wave, the frequency characteristic thereof periodically changes depending on the width d of the void.

$$L = \sqrt{\frac{1}{T}\int_0^T \{h_{(t)}\}^2 dt} \quad (8)$$

This is because not only the phase of the signal reflected at the bottom surface of the void is inverted, but also the phenomenon whereby the phase is “delayed” occurs, whereby the decrease width of the signal level loss in the reflected wave decreases as the thickness of the void (the width d) increases until the phase deviates by ¼ wavelength. In addition, it reaches a maximum when the phase is delayed by ¼ wavelength (250 ns, void thickness is 37.5 mm), and the signal level loss in the reflected wave becomes large when exceeding.

In view of the above, a type of high-pass filter is formed in a frequency band of interest (900 MHz to 3 GHZ) due to the presence of the void, and the characteristics of the high-pass filter are shown as a function of the width of the void (the width in the vertical direction) and the frequency. Since this high frequency component is a phenomenon generated by the principle that the high frequency component more easily passes through than the low frequency component due to the frequency characteristic, a change in the high frequency caused by this phenomenon can be regarded as a relative increase in the high frequency component due to the frequency characteristic. That is, it can be recognized that the high-frequency component in the reflected wave relatively increases due to the presence of the void.

Display Examples

FIGS. 8A to 8I are diagrams showing display examples of the void detection result according to the present embodiment. With reference to FIGS. 8A to 8I, a display example of the void detection result when there is no void in the concrete C1 and a display example of the void detection result when there is a void in the concrete C1 will be described.

Pattern 1: Presence of Reinforcing Steel and Absence of Void

Figure 8:
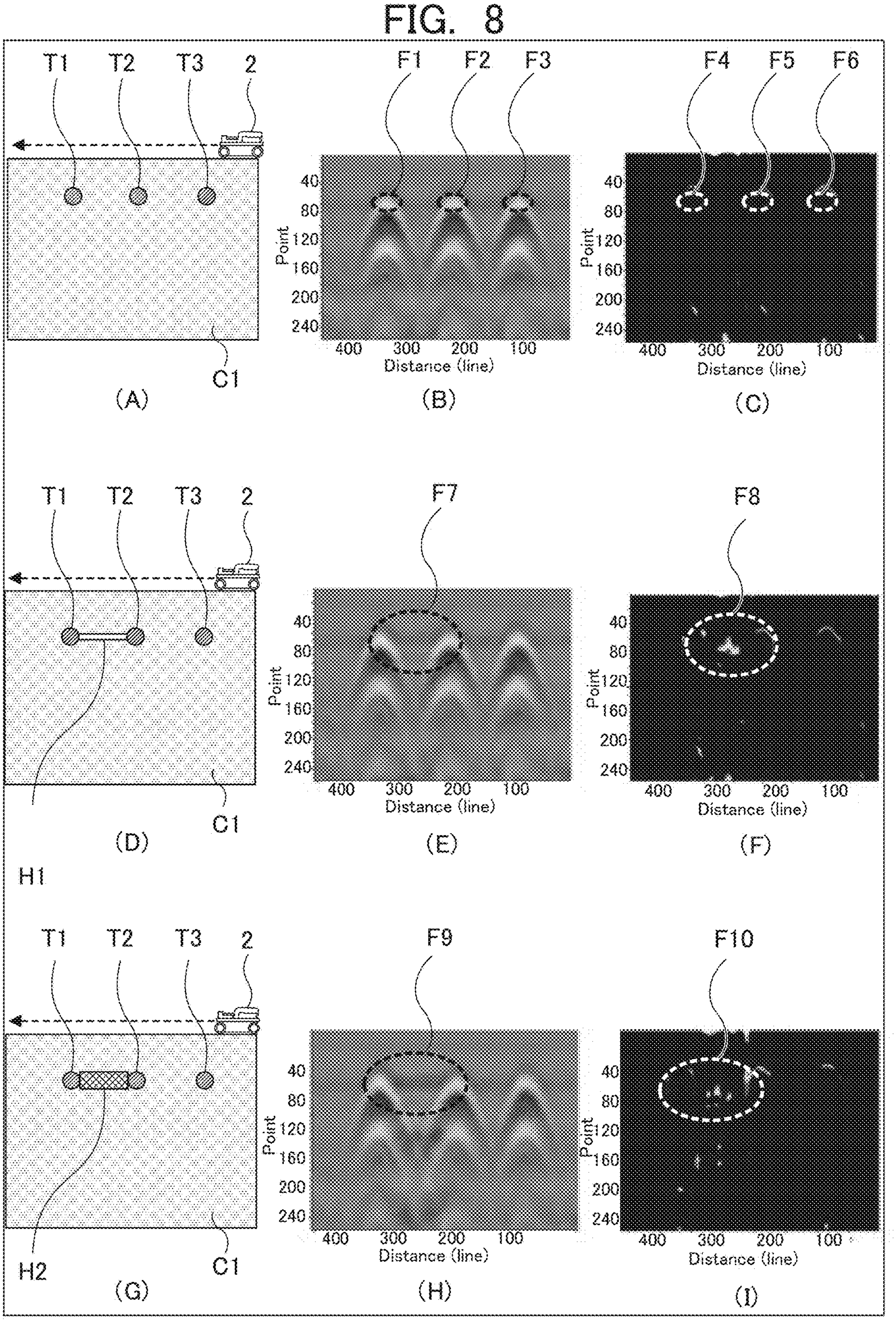
FIG. 8 is a diagram of a display example of a detection result.

FIG. 8A is a diagram showing an example in which the reinforcing steels T1 to T3 are embedded in the concrete C1 and no void exists. In FIG. 8A, the inspection device 2 irradiates electromagnetic waves toward the inside of the concrete C1 while moving from the right end to the left end on the upper surface of the concrete C1, and acquires the reflected wave from the inside of the concrete C1.

FIG. 8B is a diagram showing a B-mode image of the reflected wave acquired by the inspection device 2. In the B-mode image shown in FIG. 8B, the horizontal axis represents the moving distance from the right end of the inspection device 2, the vertical axis represents time, and the shading represents the amplitude of the reflected wave. For example, when the amplitude of the reflected wave is 0, it is indicated by gray color. The gray color becomes darker (darker shading) as the minus portion of the amplitude of the reflected wave becomes larger, and the gray color becomes brighter (lighter shading) as the plus portion of the amplitude of the reflected wave becomes larger. Further, the B-mode image shown in FIG. 8B can be regarded as a B-mode image in which temporal changes of reflected waves at respective points are arranged in a direction in which the inspection device 2 scans (from the right end to the left end). Here, the electromagnetic wave irradiated from the inspection device 2 spreads in the front-rear direction in the scanning direction. Therefore, the electromagnetic wave is reflected by the reinforcing steel from an oblique direction, and the reflected wave is received, even if the electromagnetic wave is not located immediately above the reinforcing steel (object). In this case, when the electromagnetic wave hits the reinforcing steels T1 to T3 from an oblique direction, they are displayed deeper than the actual depth. Further, when the inspection device 2 becomes closer to the reinforcing steel, the distance in the oblique direction becomes shorter and becomes shortest immediately above the reinforcing steel, and the distance in the depth direction at this time becomes the distance from the actual reinforcing steel and the surface. That is, the positions denoted by reference symbols F1 to F3 correspond to the positions of the reinforcing steels T1 to T3 in FIG. 8A, respectively, and, therefore, reference symbols F1 to F3 (top portions of mountain-shaped waveforms) indicate the depths of the reinforcing steels T1 to T3. Further, when scanning is performed beyond the reinforcing steels, since the distance from the reinforcing steels increases as distancing from the reinforcing steels, as shown in FIG. 8B, the waveform of the reflected wave becomes a mountain-shaped waveform even when the cross section is round like the reinforcing steel.

FIG. 8C is a diagram showing a KR image corresponding to the B-mode image shown in FIG. 8B. Here, in FIG. 8C and FIGS. 8F and 8I described below, as described above, the luminance becomes higher (white) as the ratio KR corresponding to the target interval of the short-time Fourier transform becomes higher, and the luminance becomes lower (black) as the ratio KR becomes closer to a predetermined threshold (for example, 0.7). When the ratio KR is equal to or less than a predetermined threshold, the luminance value is 0 (black). The portions denoted by reference symbols F4 to F6 correspond to the portions denoted by reference symbols F1 to F3 in FIG. 8B. As shown in FIG. 8C, when there is no void in the concrete C1, it can be determined that there is no void because there is no portion with high luminance. It should be noted that the magnitude of the ratio KR may be indicated by chromaticity instead of luminance. For example, as the ratio KR corresponding to the target interval of the short-time Fourier transform is higher, the color is closer to a warm color (e.g., red), and as the ratio KR is closer to a predetermined threshold, the color is the closer to a cold color (e.g., blue). At this time, when the ratio KR is equal to or less than a predetermined threshold, the color is displayed in blue.

Pattern 2: Presence of Reinforcing Steel and Presence of Void (Cavity)

FIG. 8D is a diagram showing an example in which the reinforcing steels T1 to T3 are embedded in the concrete C1 and a void H1 (cavity, for example, a gap of 2 mm) exists between the reinforcing steels T1 and T2. In FIG. 8D, similarly to FIG. 8A, the inspection device 2 irradiates electromagnetic waves toward the inside of the concrete C1 while moving from the right end to the left end on the upper surface of the concrete C1, and acquires reflected waves from the inside of the concrete C1.

FIG. 8E is a diagram showing a B-mode image of a reflected wave obtained by the inspection device 2 of FIG. 8D. The portion denoted by symbol F7 corresponds to the position of the void H1 in FIG. 8D. In the portion denoted by symbol F7, the amplitude of the data of the reflected wave slightly changes as compared with FIG. 8B.

FIG. 8F is a diagram showing a KR image corresponding to the B-mode image shown in FIG. 8E. The portion denoted by symbol F8 corresponds to the portion denoted by symbol F7 in FIG. 8E. As shown in FIG. 8F, in a case where the void H1 exists in the concrete C1, since the luminance is high as in the portion denoted by the symbol F8, it can be determined that the void exists objectively.

Pattern 3: Presence of Reinforcing Steel and Void (Junker)

FIG. 8G is a diagram showing an example in which the reinforcing steels T1 to T3 are embedded in the concrete C1 and a void H2 (junker) exists between the reinforcing steels T1 and T2. In FIG. 8G, similarly to FIG. 8A, the inspection device 2 irradiates electromagnetic waves toward the inside of the concrete C1 while moving from the right end to the left end on the upper surface of the concrete C1, and acquires reflected waves from the inside of the concrete C1.

FIG. 8H is a diagram showing a B-mode image of a reflected wave obtained by the inspection device 2 of FIG. 8G. The portion denoted by symbol F9 corresponds to the position of the void H2 in FIG. 8G. In the portion denoted by symbol F9, the amplitude of the data of the reflected wave slightly changes as compared with FIG. 8B.

FIG. 8I is a diagram showing a KR image corresponding to the B-mode image shown in FIG. 8H. The portion denoted by symbol F10 corresponds to the portion denoted by symbol F9 in FIG. 8H. As shown in FIG. 8I, when the void H2 exists in the concrete C1, since the luminance is intermittently high as in the portion denoted by the symbol F10, it can be determined that the void (junker) exists objectively.

Advantageous Effects of Present Embodiment

According to the above-described embodiment, it is possible to detect the presence or absence of a void using a non-destructive inspection device. As a result, the presence or absence of a void can be objectively determined regardless of the skill of the operator by specifying the position of the void by the image rather than the operator checking the image of the reflected wave based on experience. That is, the level, phase, or shape of the reflected wave of the existing electromagnetic wave is not determined by the subjectivity of the technician, but by numerical analysis of the obtained reflected wave, whereby it is possible to detect a defective portion in the inspection object. In addition, the life of the concrete structure can be extended by quickly detecting and repairing the state of the aging deterioration in the concrete (inspection object).

Further, according to the above-described embodiment, by indicating that the frequency characteristic of the reflected wave changes depending on the void, the influence of the thickness of the void, the frequency of the irradiated electromagnetic wave, and the reflection coefficient of the medium on the signal level of the reflected wave can theoretically be derived. Specifically, it is possible to represent a physical phenomenon occurring when a void exists by a model equation, and clarify the principle of the shift of the frequency characteristic of the reflected wave from the cavity by solving the equation. That is, it is possible to clarify the principle in which, when the electromagnetic wave reflects the void, the reflected signal at the upper surface of the void and the signal delayed by the thickness of the cavity due to the inversion of the phase when a portion of the electromagnetic wave passes through the void and is then reflected at the bottom surface of the void are added to each other, resulting in the shift of the frequency characteristic of the reflected wave from the cavity.

Further, according to the above-described embodiment, by focusing on the frequency of the reflected wave, it is possible to extract a characteristic (frequency characteristic) of a void which does not appear in the phase or amplitude of the reflected wave. It is also possible to capture a change in the frequency characteristic caused by the presence of a void in the medium. Further, by calculating the ratio KR between the signal level ML of the frequency of interest as a method of capturing this change and the signal level KL of the frequency approximately twice the signal level ML of the frequency, it is possible to separate the reflected wave by the void from the reflected waves. Further, even when a void and an embedded object such as a metal are present in the concrete (inspection object), by using the ratio KR, it is possible to separate the reflection from the metal and the reflection from the void, and thus, it is possible to detect the presence or absence of the void.

Further, according to the above-described embodiment, since it is possible to detect even a cavity having a gap of 2 mm, it is possible to find unintended defects such as an internal cavity due to a filling failure in the concrete or floating due to rusting of the pipe. Further, since it is possible to detect a junker having a gap of 2 mm, for example, it is possible to find a defective portion due to a filling failure, an initial defect generated during construction, and the like.

Further, by using the electromagnetic wave radar method as the inspection method, it is possible for the sensor to perform measurement in a non-contact manner and perform the measurement while scanning the measurement surface. Therefore, it is possible to improve the work efficiency as compared with the elastic wave method (shock elastic wave method, ultrasonic wave method) in which the sensor is brought into contact with the measurement surface.

Although an embodiment of the present invention has been described above, the present invention is not limited to the above embodiment, and modifications, improvements, and the like are included in the present invention as long as the object of the present invention can be achieved.

Second Embodiment

Summary

In the first embodiment described above, void detection is performed using the ratio. On the other hand, in the second embodiment, attention is paid to the fact that interference of electromagnetic waves occurs due to the presence of voids in the inspection object, and the spectral center of gravity of the received signal (spectral distribution of the received signal) changes due to the interference, and the server 1 detects voids based on this change. Although an example in which the spectral center of gravity is used as an index for measuring a change in the spectrum distribution of the received signal will be described in the present embodiment, another method such as the method of the first embodiment or the spectral flatness may be used as a method for indexing the spectrum distribution. Further, the server 1 according to the present embodiment detects the thickness (width d) of the void based on the change in the spectral center of gravity. Hereinafter, the present embodiment will be described with reference to the drawings. The system configuration of the void detection system according to the present embodiment and the hardware configuration of the server 1 are similar to those of the first embodiment described above, and thus a description thereof is omitted. In addition, with respect to the functional configuration and the processing contents, portions different from those of the first embodiment will be described in detail, and a description of the same configuration or processing will be omitted.

Functional Configuration of Server 1

Figure 9:
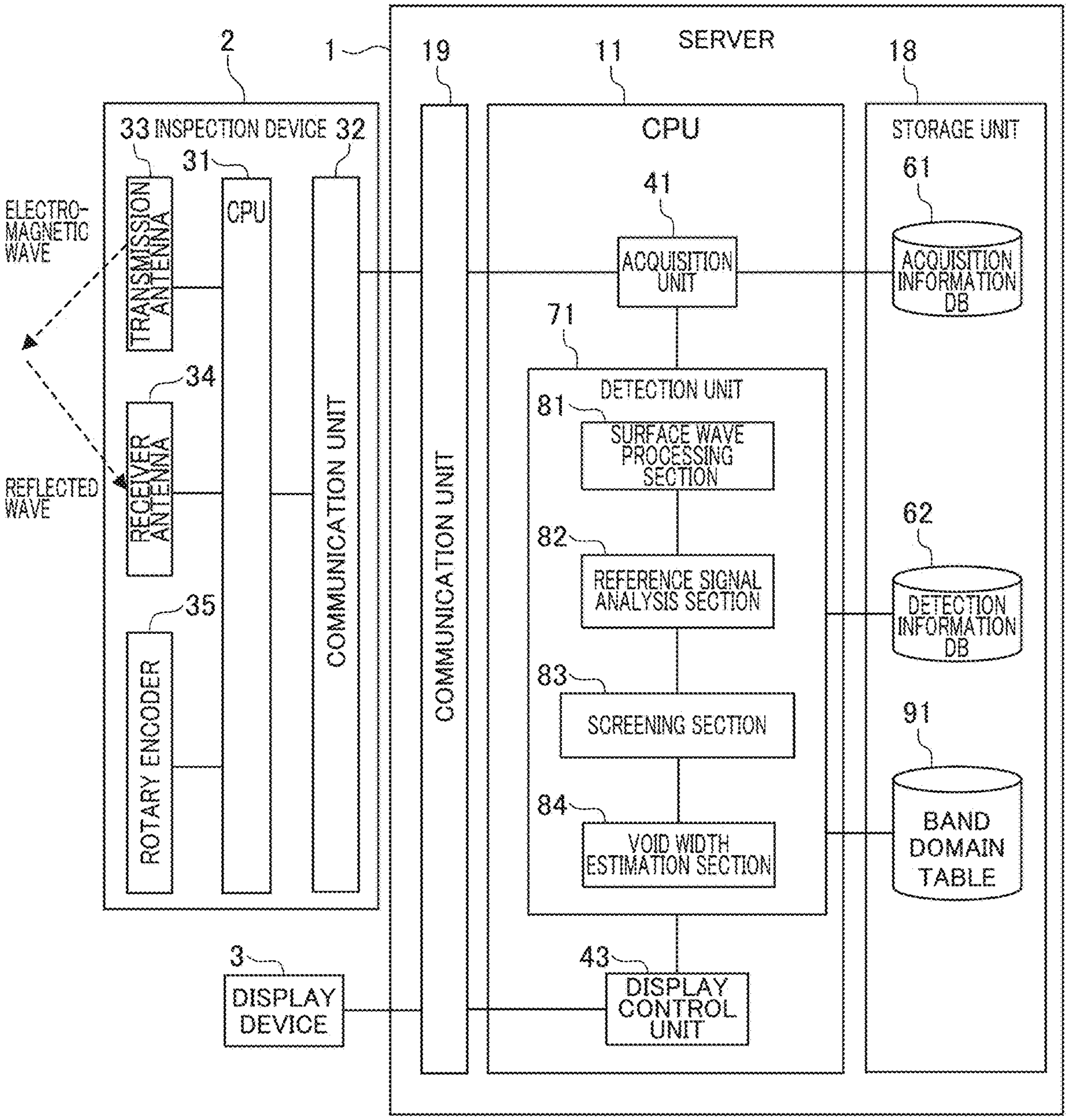
FIG. 9 is a functional block diagram of an example of a functional configuration of a server.

FIG. 9 is a functional block diagram showing an example of a functional configuration of a server. When the CPU 11 of the server 1 operates, the acquisition unit 41, the display control unit 43, and a detection unit 71 function. Since the acquisition unit 41 and the display control unit 43 are the same as in the first embodiment, description thereof will be omitted.

The detection unit 71 detects a void in the concrete C1 (inspection object) based on the data of the reflected wave acquired by the acquisition unit 41. Further, the detection unit 71 estimates the thickness (void width) of the void in the concrete C1 (inspection object) based on the data of the reflected wave acquired by the acquisition unit 41. The following describes a surface wave processing section 81, a reference signal acquisition section 82, a screening section 83, and a void width estimation section 84, which are functional sections included in the detection unit 71.

The surface wave processing section 81 removes a signal reflected from the surface of a non-inspection object. Here, the reflected wave (radar signal) received by the inspection device 2 includes a signal reflected by the surface wave (surface) of the inspection object (an object to be measured; for example, the concrete C1). Since the surface wave is a large signal, the surface wave needs to be removed in order to process a signal inside the concrete C1. In general, the surface wave processing is often held as a function of the inspection device 2, and may be performed in the processing performed by the CPU 31 in the inspection device 2. That is, the acquisition unit 41 may acquire the reflected wave processed on the surface. In this case, the processing in the surface wave processing section 81 is not performed.

The reference signal acquisition section 82 acquires a reference signal RS that is a reflected wave of the reinforcing steel (metal) in the concrete to be measured. Therefore, in the present embodiment, the above-described acquisition unit 41 acquires the above-described reflected wave so as to include the reflected wave of the reinforcing steel. However, the reference signal RS may be acquired based on the acquired reflected wave in advance.

The reference signal RS is a signal assuming an input wave with respect to a void. Although the electromagnetic wave (transmission wave) irradiated by the inspection device 2 may be used as an input wave to the void and analysis may be performed based on the input wave and the reflected wave, the above-described reflected wave includes those which are the transmission wave affected by the void and those which are affected by simply passing through the concrete C1. Therefore, in the present embodiment, not the transmission wave itself, but rather the reflected wave of the transmitted electromagnetic wave from the reinforcing steel in the concrete to be measured is used as an input wave to the void, and this signal is used as the reference signal RS. Then, analysis is performed based on the reference signal RS and the reflected wave. Thus, by using the reference signal RS, it is possible to simultaneously calibrate the transmission wave characteristics of the inspection device 2 and the frequency characteristics of the measurement target.

The screening section 83 screens a portion where a void appears to exist. In the present embodiment, it is possible not only to detect a void, but also to estimate a void width. However, it is not necessary to perform estimation of a void width, which will be described later, by applying a processing cost for a portion where no void exists. Accordingly, a portion where a void is present is screened, and a void width is estimated as described later for a portion where a void is considered to exist. As for the method of screening, when the void width exceeds 10 mm, it is possible to detect a gray-scale image based on the amplitude value of the radar signal in the time domain by using various existing techniques. However, when the void width is less than 10 mm, lapses are likely to occur in the existing technology. For example, when the void width is 6 mm or less, detection becomes difficult. Therefore, it is preferable to select a void portion by a value obtained by multiplying an amplitude signal having the same phase with respect to a transmission wave by a spectral center of gravity SC described later. Since the threshold of the determination at this time depends on the transmission wave characteristics of the inspection device 2, it is necessary to optimize the threshold for each device. It should be noted that the processing of the screening section 83 may not be performed. That is, the void width may be estimated based on all the acquired reflected waves.

Based on the value of the spectral center of gravity SC in the reflected wave (composite wave), the void width estimation section 84 estimates the width of the void inside the concrete C1 (inspection object). In the present embodiment, the void width estimation section 84 estimates the width of the void using an association table (a band domain table BT) which is provided in advance and in which each of the void widths and the value of the spectral center of gravity SC in a plurality of bands is associated with each other. Further, in the present embodiment, it is assumed that the void width estimation section 84 calculates the spectral center of gravity SC (value) for each band from the reflected wave of the portion at which there may be a void, extracted by the above-described screening.

Reflected Wave

Here, the reflected wave (signal) received by the inspection device 2 is generally a time domain signal. In the present embodiment, it is assumed that the void width estimation section 84 uses a reflected wave represented by Equation 10 below. In Equation 10, α, β, and a are the same as those shown in the above Equations 3 to 5, and thus description thereof is omitted. Further, f(t) denotes a transmission wave (a reference signal RS in the present embodiment) transmitted by the inspection device 2, and h(t) denotes a reflected wave (an observed wave) received by the inspection device 2. In the present embodiment, multiple reflections in the void are taken into consideration. Multiple reflections will be described with reference to FIG. 10.

$$h_{(t)} = \alpha f_{(t)} + \sum_{n=1}^{5} \alpha^{2(n-1)} \beta f_{(t-a\,n)} \tag{10}$$

Figure 10:
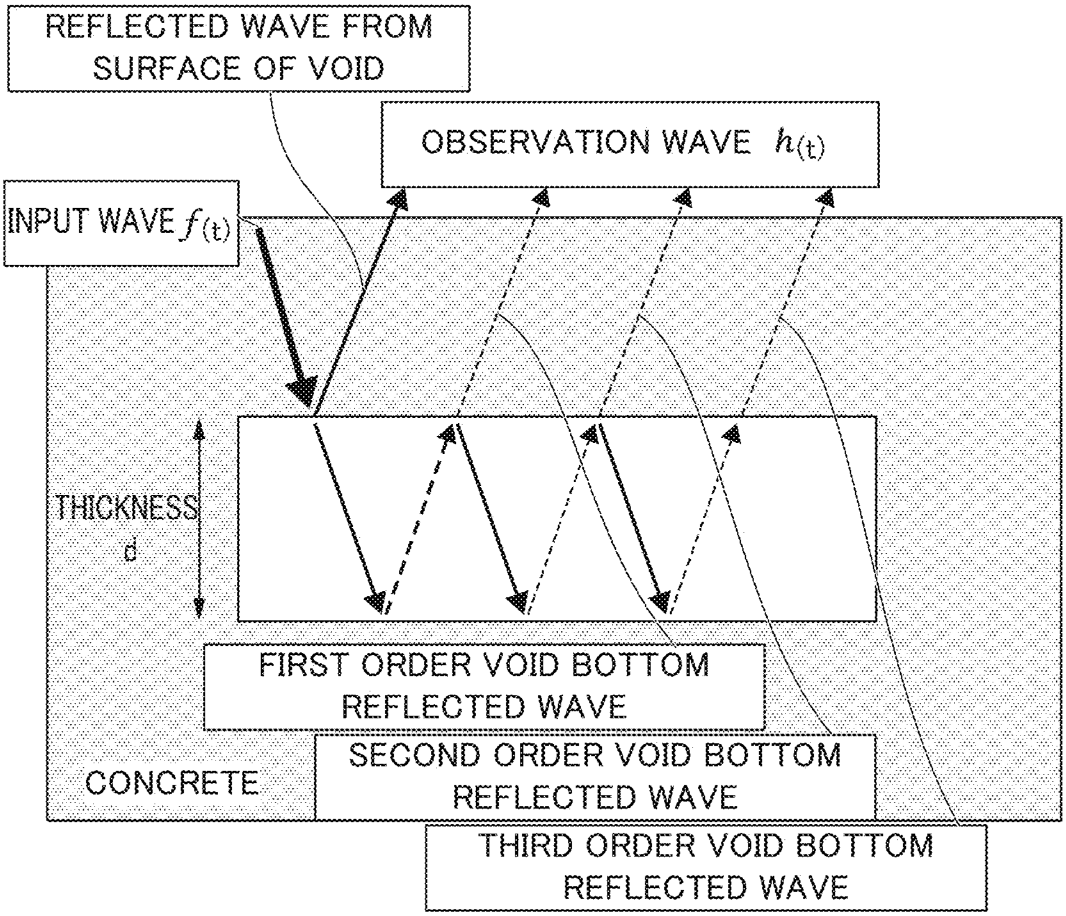
FIG. 10 is a diagram of an example of detecting a void in an inspection object.

FIG. 10 is a diagram showing an example of detecting a void in an inspection object. As shown in FIG. 10, the electromagnetic wave irradiated from the inspection device 2 is reflected a plurality of times at the upper surface of the void and the bottom surface of the void. Therefore, the reflected wave received by the inspection device 2 may be a composite wave of these observation waves. Therefore, in the present embodiment, the reflected wave h(t) in consideration of the first to fifth order void bottom reflected waves is analyzed (Equation 10).

Spectral Center of Gravity SC

Next, the void width estimation section 84 performs Fourier transform on the reflected wave ht in the time domain. Then, the void width estimation section 84 calculates the spectral center of gravity SC for the signal Hω in the frequency domain obtained by Fourier transform of the reflected wave h(t) (Equation 11). Here, $f_k$ is the center frequency of the k-th bin when the frequency is bin-divided. $S_k$ is the amplitude spectrum value of the k-th bin when the frequency is bin-divided. Further, b1 and b2 are the lower limit and the upper limit bin numbers when the frequencies in the range for calculating the spectral center of gravity are bin-divided.

$$\text{SPECTRAL CENTER OF GARVITY } SC = \left(\sum_{k=b_1}^{b_2} f_k\ S_k\right) \Big/ \left(\sum_{k=b_1}^{b_2} S_k\right) \tag{11}$$

The spectral center of gravity SC obtained by Equation 11 is a value obtained as a weighted average of frequencies present in the signal. By using the spectral center of gravity SC, only the main frequency band of the transmission wave may be taken into account, and since the calculation of the spectral center of gravity has an effect of averaging the entire band, it can be expected that the robustness becomes high.

Band Domain

Figure 11:
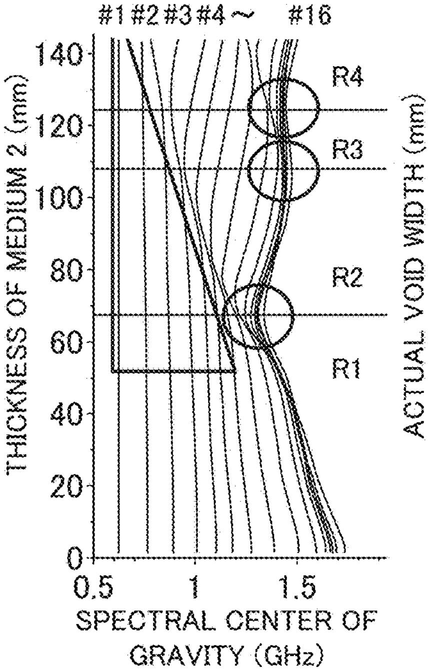
FIG. 11 is a diagram of a relationship between a spectral center of gravity and a width of a void in each band.
Figure 11:
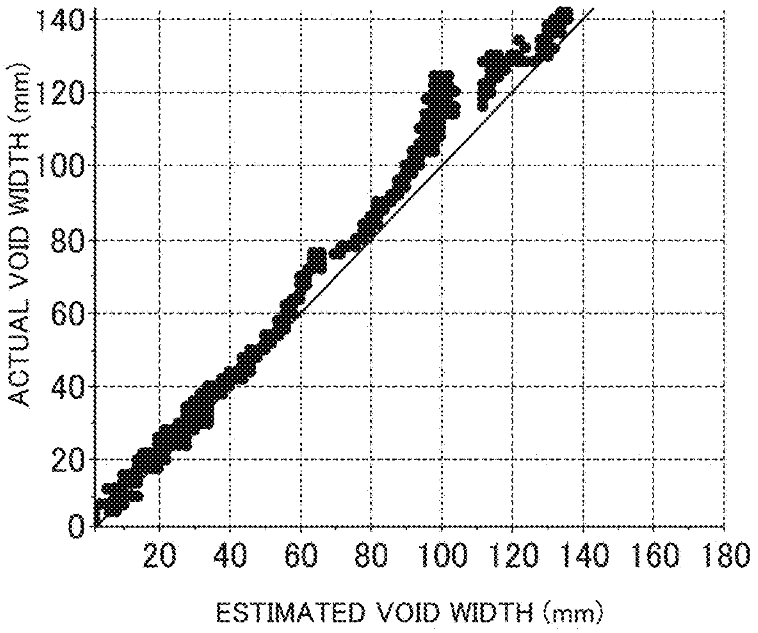

Here, since the above-described spectral center of gravity SC is a multivalent function with respect to the void width, it cannot be solved analytically. FIG. 11B is a diagram showing the relationship between the spectral center of gravity in each band and the width of the void (the thickness in the vertical direction) for each band shown in FIG. 11A. As shown in FIG. 11B, even if the spectral center of gravity is obtained, the spectral center of gravity cannot be simply associated with the estimated value of the void width in one-to-one correspondence. Here, since a different spectral center of gravity SC is shown when the band for obtaining the spectral center of gravity SC is changed, in the present embodiment, the spectral center of gravity SC for each band of the reflected wave (the received signal) is calculated and band characteristics are simulated in advance. This simulation result is defined as a band domain. By converting the spectral center of gravity SC, which is a frequency domain, into a band domain, a multivalent function can be solved analytically. In the present embodiment, the reference signal RS, which is the reflected wave of the metal of the inspection object, is used as the transmission wave used in the simulation. However, the present application is not limited thereto, and a sinc function may be used, for example.

Band Domain Table

The simulation waveform for each void width is calculated using the reference signal RS as described above (Equation 10). The spectral center of gravity is obtained by changing the band for each signal of the void width obtained by this simulation. The value of the spectral center of gravity SC in each band for each void width thus obtained becomes a two-dimensional matrix. This matrix is referred to as a band domain table BT. It is assumed that the generated band domain table BT is stored in the band domain table 91. At this time, since the accuracy is improved by performing weighting at the time of determination due to the frequency characteristic of the transmission wave, it is preferable to increase the weight as the low frequency is included, as shown in FIG. 11A. With such a configuration, as shown in FIG. 11C, it is possible to increase the degree of match between the estimated width of the void and the actual measurement value. In the present embodiment, the width of each band is set between 0.5 GHZ and 4 GHZ, but the present invention is not limited thereto.

The void width estimation section 84 calculates a correlation between the spectral center of gravity SC (the measured value) for each band based on the reflected wave and the band domain table BT, and sets a value having the highest correlation as the estimated void width. The method of evaluating the correlation is not particularly limited, but, for example, the residual sum of squares of the spectral center of gravity SC of the measured value and the band domain table BT is calculated, and it is preferable to determine that the smallest residual square sum is high in correlation. Specifically, for example, the void width estimation section 84 estimates the width d as the width of the void when the RSS (Residual Sum of Squares) of Expression 12 is minimized.

$$RSS = \sum_{n=1}^{N} \left(BT_{(d,SC_n)} - D_{(1,SC_n)}\right)^2 \tag{12}$$

Processing Contents

Figure 12:
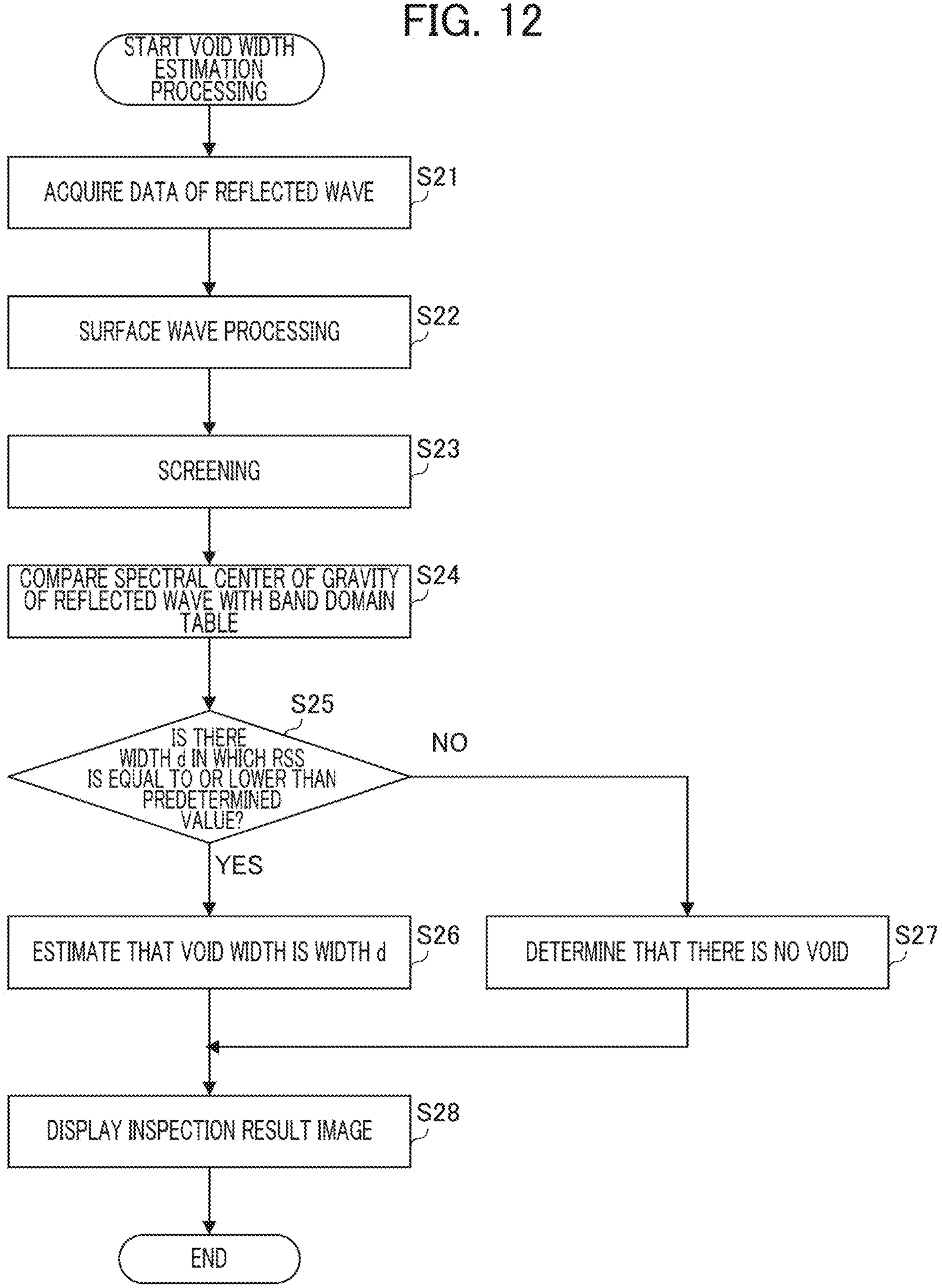
FIG. 12 is a flowchart of the operation of void width estimation processing.

FIG. 12 is a flowchart showing an example of void width estimation processing according to the present embodiment. It is assumed that the reference signal RS is acquired in advance. It is assumed that the band domain table BT is generated in advance and stored in the band domain table 91 based on the reference signal RS.

In step S21, the acquisition unit 41 acquires the data of a reflected wave from the inspection device 2. The acquisition unit 41 records the acquired data of the reflected wave in the acquisition information DB 61.

In step S22, the surface wave processing section 81 removes a signal reflected from the surface of the non-inspection object from the reflected wave.

In step S23, the screening section 83 screens a portion where a void appears to exist. In other words, the screening section 83 roughly detects the presence or absence of voids.

In step S24, the void width estimation section 84 compares the spectral center of gravity SC of the reflected wave in a plurality of bands with the band domain table BT.

In step S25, the void width estimation section 84 determines whether or not there is a width d in which the RSS represented by Equation 12 described above is equal to or less than a predetermined value. When this condition is satisfied (S25—Yes), the void width estimation section 84 estimates the width d having the smallest RSS as the void width (S26). When the above condition is not satisfied (S25—No), the void width estimation section 84 determines that there is no void.

In step S28, the display control unit 43 displays, as an inspection result image, an image (a B-mode image) corresponding to the data of the reflected wave and a determination image by the above-described processing on the display device 3.

Display Examples

Figure 13:
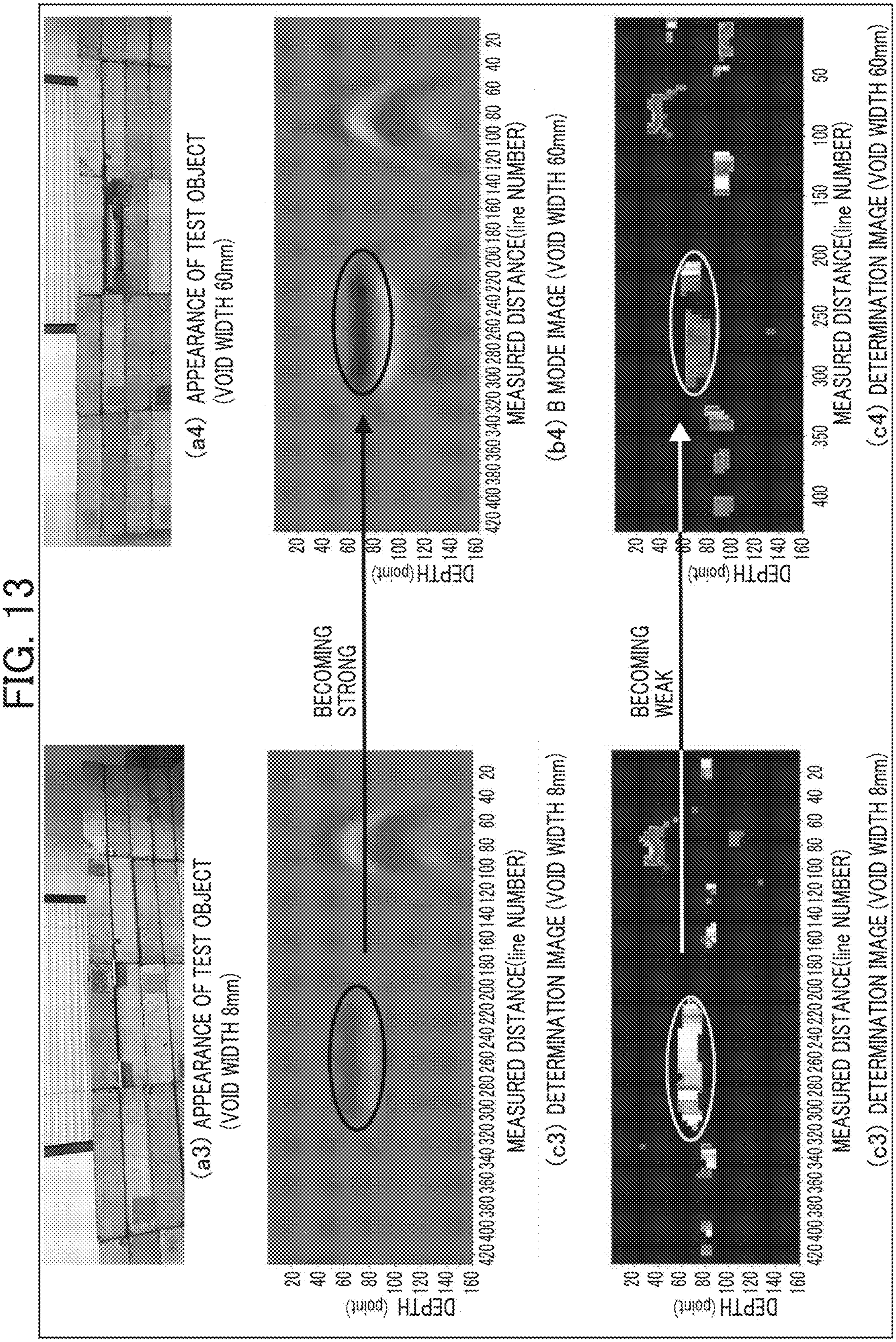
FIG. 13 is a diagram of a display example of an estimation result.

FIG. 13 is a diagram showing a display example of an estimation result. In FIG. 13, the upper part shows the appearances of test objects, the middle part shows B-mode images (determination images) of the reflected waves obtained by the inspection device 2, and the lower part shows images (determination images) in which each of the estimated widths of the voids in the test objects is expressed by a color (for example, shading). In FIG. 13, the left side shows an example of the width of the void of 8 mm, and the right side shows an example of the width of the void of 60 mm. As shown in FIG. 13, as the width of the void becomes larger, the gray-scale display in the B-mode image becomes stronger (darker). Further, in the present embodiment, as the width of the void becomes larger, the determination image obtained by changing the color (lighter) in the image shown in the lower part of FIG. 13 is displayed as an inspection result image. Thus, it is possible for a user to easily recognize the width of the void (the estimated value). In the determination image, the width of the bar in the image may be changed in accordance with the width of the void (the estimated value). That is, with a larger width of the void, the width of the bar in the image shown in the lower part of FIG. 13 becomes larger (the image indicating the estimated value of the width of the void).

Advantageous Effects of Present Embodiment

According to the present embodiment, in addition to detecting the presence or absence of a void, it is possible to estimate the width of the void. Further, by comparing with the band domain table, it is possible to detect an extremely small void having a width of 2 mm, for example.

In addition, it is possible to reduce the analysis time by performing the analysis based on the screened results instead of performing the analysis on all the reflected waves.

Further, by analytically obtaining a simulation signal for a portion where a void has been detected in advance by using a reference signal, and obtaining a correlation between a band characteristic of the simulation signal and a measured value, it is possible to estimate the width of the void more accurately and more easily than the void detection performed based on the subjectivity of the technician by referring to amplitude and phase.

Modified Example

In the above-described embodiments, the inspection device, the information processing device (server), and the display device are described as separate examples. However, the configuration is not particularly limited and, for example, one device may have functions of two or more of the above-described devices.

In the above-described embodiment, an example in which the reinforcing steels are embedded in the inspection object (concrete) is described. However, it is possible to similarly detect the voids even when artificial objects (embedded objects) such as steel frames, metal tubes, and metal pieces are embedded. Further, even when only the void exists in the inspection object, it is possible to detect the void by the above-described detection processing.

Although a concrete is described as an example of the inspection object in the above embodiment, the inspection object is not particularly limited. For example, the inspection object may be an airport runway (asphalt), a road, a geological formation, a building, a bridge, a tunnel, a paving, a house, a human body, or the like.

In the above embodiment, the electromagnetic wave radar method is used as the method of inspecting the inside of the inspection object (concrete). However, the inspection method is not particularly limited. For example, as a method of inspecting the inside of a concrete, a sound striking method, a shock-acoustic wave method, an ultrasonic method, an infrared thermography method, a method using FWD (Falling Wight Deflectometer), or the like may be used. The sound striking method is an inspection method for subjectively inspecting an internal state by striking a concrete with a hammer or the like and listening to the striking sound by an operator. Similarly to the sound impact method, the shock-acoustic wave method is a method of applying an impact by hitting a surface of a concrete to be inspected with a steel ball, a hammer, or the like, and measuring an elastic wave generated inside the concrete by the impact to evaluate the concrete. The ultrasonic method is a method using a longitudinal elastic wave similar to the shock elastic wave method, and is a method of inspecting the inside of a concrete by measuring a round trip time of the longitudinal elastic wave. The infrared thermography method is a method in which infrared rays are irradiated from an inspection device and infrared radiation energy from the inside of a concrete is detected by an infrared camera to inspect the inside of the concrete. A method using FWD is a method in which a falling weight is freely dropped, and a deflection sensor is installed at every fixed distance from a drop point of the weight to measure how the displacement appears in the surface layer due to the impact.

In the above-described embodiment, an example in which the Fourier transform is used as a method of frequency analysis is described. However, a wavelet transform may be used as long as frequency characteristics can be obtained by frequency analysis.

In the above-described embodiment, the void detection is performed using the ratio. However, if only the cavity exists in the inspection object, it is possible to detect the presence or absence of the void depending on whether or not the value KL is equal to or greater than a predetermined value.

In the above-described embodiment, even when the reinforcing steels and the like are unevenly distributed in the inspection object, it is possible to detect the void. However, it is possible to detect the void by using the value KL only so long as objects such as pipes are embedded evenly. For example, when the value KL is obtained, the range to be integrated is set to the same range as the pitch of the reinforcing steels, and the influence of the reinforcing steels is removed, whereby it is possible to detect the void. With such a configuration, even if the ratio KR is not used, it is possible to detect the reaction of the void by making the high-frequency reaction (influence) by the reinforcing steels constant.

In the above-described embodiment, a display example in which a void exists in an inspection object is described. In such a case, a warning indicating the presence of a void may be displayed on the display device or a warning sound may be issued.

In the above-described embodiment, the device provided with the wheels is described as an example of the inspection device. However, the inspection device is not particularly limited. For example, the inspection object may be inspected using a flight-type inspection instrument (a drone, or the like).

In the above-described embodiment, the example of estimating the void width using the correspondence table is described. However, the present invention is not limited thereto. For example, a classifier generated by machine learning may be used to estimate the void width based on the spectral center of gravity obtained from the reflected wave.

For example, the series of processing described above can be executed by hardware or software. In other words, the functional configuration of FIG. 4 is merely an example and is not particularly limited. That is, it suffices if the information processing system has a function capable of executing the above-described series of processing as a whole, and what kind of functional block is used to realize this function is not particularly limited to the example of FIG. 2. The location of the functional block is not particularly limited to that shown in FIG. 4, and the functional block may be located at any position. For example, the functional block of the server may be located at the inspection device, the display device, or the like. Conversely, the functional block of the inspection device or the display device may be located at the server or the like. Further, one functional block may be configured by a single piece of hardware, a single piece of software, or a combination thereof.

When a series of processing is executed by software, programs constituting the software are installed in a computer or the like from a network or a recording medium. The computer may be a computer incorporated in dedicated hardware. Further, the computer may be a computer capable of executing various functions by installing various programs, for example, a general-purpose smartphone or personal computer in addition to a server.

The recording medium containing such programs is not only a removable medium (not shown) distributed separately from the device main body in order to provide the program to the user or the like, but also a recording medium or the like provided to the user or the like in a state of being incorporated in the device main body in advance.

It should be noted that, in the present specification, the steps describing the program recorded in the recording medium include not only the processing performed in time series following this order, but also the processing performed in parallel or individually without necessarily being processed in time series. In addition, in this specification, the term “system” indicates an overall device including a plurality of devices, a plurality of means, units, or sections, and the like.

Others

For example, the series of processing described above can be executed by hardware or software. In other words, the functional configuration described above is merely illustrative and is not particularly limited. That is, it suffices if the information processing system is provided with a function capable of performing the above-described series of processing as a whole, and what kind of functional block is used to realize this function is not particularly limited to the above-described example. The location of the functional block is not particularly limited, and the functional block may be located at any position. For example, the functional block of the server (the information processing device) may be located at another device or the like. Conversely, the functional block of other devices may be located at the server or the like. Further, one functional block may be configured by a single piece of hardware, a single piece of software, or a combination thereof.

When a series of processing is executed by software, a program constituting the software is installed in a computer or the like from a network or a recording medium. The computer may be a computer incorporated in dedicated hardware. Further, the computer may be a computer capable of executing various functions by installing various programs, for example, a general-purpose smartphone or personal computer in addition to a server.

The recording medium containing such programs is not only a removable medium (not shown) distributed separately from the device main body in order to provide the program to the user or the like, but also a recording medium or the like provided to the user or the like in a state of being incorporated in the device main body in advance. Since the program can be distributed via a network, the recording medium may be mounted on or accessible to a computer connected to or connectable to the network.

It should be noted that, in the present specification, the steps describing the program recorded in the recording medium include not only the processing performed in time series along the order, but also the processing performed in parallel or individually without necessarily being processed in time series. In addition, in this specification, the term “system” indicates an overall device including a plurality of devices, a plurality of means, units, or sections, and the like.

In other words, the information processing device to which the present invention is applied can take various embodiments having the following configurations.

(1) An information processing device includes an acquisition unit that acquires data of a reflected wave generated by irradiating an electromagnetic wave from a surface toward an interior of an inspection object and causing the electromagnetic wave to be reflected inside the inspection object; and a detection unit that detects presence or absence of a void in the inspection object based on the data of the reflected wave acquired by the acquisition unit.

(2) The information processing device according to (1), in which the detection unit determines whether an object that has reflected the electromagnetic wave is a void or an embedded object in the inspection object based on the data of the reflected wave.

(3) The information processing device according to (1) or (2), in which the detection unit includes an analysis section that performs frequency analysis on the data of the reflected wave, and detects presence or absence of the void based on a frequency characteristic of the reflected wave acquired by the frequency analysis of the analysis section.

(4) The information processing device according to any one of (1) to (3), in which the detection unit detects presence or absence of the void based on a frequency characteristic of a composite wave of a first reflected wave at a first surface of the void inside the inspection object and a second reflected wave at a second surface opposite to the first surface of the void.

(5) The information processing device according to (4), in which the detection unit determines that the void exists inside the inspection object in a case in which a ratio of a second signal level KL in a second frequency band of the composite wave higher than a first frequency band to a first signal level ML in the first frequency band of the composite wave (KL/ML) is equal to or greater than a predetermined threshold.

(6) The information processing device according to (5), further including a display control unit that displays on a display device an intensity of the ratio in a manner that, as the ratio of the second signal level KL to the first signal level ML (KL/ML) is larger, luminance or chromaticity becomes higher.

(7) The information processing device according to (4), in which the detection unit estimates a width of the void inside the inspection object based on a value of a spectral center of gravity in the composite wave.

(8) The information processing device according to (7), in which the detection unit estimates the width of the void inside the inspection object based on the value of the spectral center of gravity in the composite wave and an association table in which each of widths of voids is associated with a corresponding one of values of the spectral center of gravity in a plurality of bands.

(9) The information processing device according to (8), in which the detection unit generates the association table based on a reflected wave of a metal in the inspection object and the composite wave.

(10) The information processing device according to any one of (1) to (9), in which the inspection object is a composite structure including reinforcing steel and concrete.

(11) The information processing device according to (10), in which the detection unit determines whether the object that has reflected the electromagnetic wave is the void or the reinforcing steel at a location where the reinforcing steel and the void are mixed in the composite structure.

(12) A method of controlling an information processing device, the method including the steps of: acquiring data of a reflected wave generated by irradiating an electromagnetic wave from a surface toward an interior of an inspection object and causing the electromagnetic wave to be reflected inside the inspection object; and detecting presence or absence of a void in the inspection object based on the data of the reflected wave acquired in the step of acquiring.

(13) A computer program that causes a computer to execute the steps of: acquiring data of a reflected wave generated by irradiating an electromagnetic wave from a surface toward an interior of an inspection object and causing the electromagnetic wave to be reflected inside the inspection object; and detecting presence or absence of based on the data of the reflected wave acquired in the step of acquiring.

EXPLANATION OF REFERENCE NUMERALS

1: server
2: inspection device
3: display device
11: CPU
18: storage unit
19: communication unit
31: CPU
32: communication unit
33: transmission antenna
34: receiver antenna
35: rotary encoder
41: acquisition unit
42: detection unit
43: display control unit
51: frequency analysis section
52: level calculation section
53: ratio calculation section
54: void detection section
55: depth calculation section
61: acquisition information DB
62: detection information DB
71: detection unit
81: surface wave processing section
82: reference signal acquisition section
83: screening section
84: void width estimation section
91: band domain table It is claimed:

1. An information processing device with server functionality connected to an inspection device, the information processing device comprising:

a communication unit to communicate with other devices via a network; and a computer processor coupled to a storage unit;

wherein the inspection device is configured to irradiate a surface of an inspection object with electromagnetic waves and detect reflected waves from inside the inspection object, wherein the information processing device includes:

an acquisition unit that acquires data of reflected waves detected by the inspection device; and a detection unit that detects a presence or absence of a void in the inspection object based on the acquired data of the reflected waves, the acquired data acquired by the acquisition unit including a frequency characteristic of a composite wave of a first reflected wave at a first surface of the void inside the inspection object and a second reflected wave at a second surface opposite to the first surface of the void, wherein to detect the presence or absence of the void in the inspection object, the information processing device is configured to determine that the void exists inside the inspection object when a ratio of a second signal level KL in a second frequency band of the composite wave higher than a first frequency band to a first signal level ML in the first frequency band of the composite wave (KL/ML) is equal to or greater than a predetermined threshold.

2. The information processing device according to claim 1, wherein to detect presence or absence of the void in the inspection object, the detection unit determines whether an object that has reflected the electromagnetic wave is the void or an embedded object in the inspection object based on the acquired data of the reflected wave.

3. The information processing device according to claim 1, wherein to detect the presence or absence of the void in the inspection object, the detection unit includes an analysis section that performs frequency analysis on the data of the reflected wave, and to detect the presence or absence of the void based on a frequency characteristic of the reflected wave acquired by the frequency analysis of the analysis section.

4. The information processing device according to claim 1, further comprising a display control unit that displays on a display device an intensity of the ratio in a manner that, as the ratio of the second signal level KL to the first signal level ML (KL/ML) is larger, luminance or chromaticity becomes higher, wherein the display device is coupled with at least one of the other devices and the information processing device.

5. The information processing device according to claim 1, wherein the inspection object is a composite structure including reinforcing steel and concrete.

6. The information processing device according to claim 5, wherein to detect the presence or absence of the void in the inspection object, the detection unit determines whether the object that has reflected the electromagnetic wave is the void or the reinforcing steel at a location where the reinforcing steel and the void are mixed in the composite structure.

* * * * *